US012726368B2

(12) United States Patent
Uzun et al.

(10) Patent No.: US 12,726,368 B2
(45) Date of Patent: Sep. 1, 2026

(54) VALIDATING CERTIFICATE BUNDLES WITH ASYMMETRIC KEYS

(71) Applicant: Oracle International Corporation, Redwood Shores, CA (US)

(72) Inventors: Burak Uzun, London (GB); Mauruthi Geetha Mohan, Seattle, WA (US); Tony Long, Edmonds, WA (US); Owen Cliffe, Bath (GB)

(73) Assignee: Oracle International Corporation, Redwood Shores, CA (US)

( * ) Notice: Subject to any disclaimer, the term of this patent is extended or adjusted under 35 U.S.C. 154(b) by 449 days.

(21) Appl. No.: 18/466,466

(22) Filed: Sep. 13, 2023

(65) Prior Publication Data

US 2025/0088373 A1 Mar. 13, 2025

(51) Int. Cl.

*H04L 29/06* (2006.01)
*H04L 9/08* (2006.01)
*H04L 9/32* (2006.01)

(52) U.S. Cl.

CPC .......... *H04L 9/3268* (2013.01); *H04L 9/0825* (2013.01); *H04L 9/3236* (2013.01); *H04L 9/3247* (2013.01); *H04L 9/3265* (2013.01)

(58) Field of Classification Search

CPC . H04L 9/3268; H04L 9/0825; H04L 63/0823; H04L 9/3236; H04L 9/3247; H04L 9/3265; H04L 9/3263

See application file for complete search history.

(56) References Cited

U.S. PATENT DOCUMENTS 5,671,279 A 9/1997 Elgamal
5,699,431 A 12/1997 Van Oorschot et al.
7,272,714 B2 9/2007 Nagaratnam et al.
7,644,270 B1 1/2010 Cherukumudi et al.
8,176,328 B2 5/2012 Chen et al.
8,452,958 B2 5/2013 Sun et al.
9,172,543 B2 10/2015 Wnuk (Continued)

FOREIGN PATENT DOCUMENTS

CN 112019477 A 12/2020
CN 114884963 A 8/2022

(Continued)

OTHER PUBLICATIONS

"What is Certificate Lifecycle Management", Retrieved from https://www.encryptionconsulting.com/different-phases-of-a-certificate-lifecycle-management-process/, Aug. 1, 2024, pp. 1-12.

(Continued)

*Primary Examiner* — Yogesh Paliwal
(74) *Attorney, Agent, or Firm* — Invoke

(57) ABSTRACT

Operations of a certificate bundle validation service may include receiving a first certificate bundle that includes a first set of one or more digital certificates, and a digital signature, associated with the first certificate bundle; determining, using a public key of an asymmetric key pair associated with a second set of one or more digital certificates, that the digital signature is generated using a private key of the asymmetric key pair; and responsive to determining that the digital signature is generated using the private key, storing the first certificate bundle in a certificate repository as a trusted certificate bundle.

31 Claims, 9 Drawing Sheets

(56) References Cited

U.S. PATENT DOCUMENTS 9,197,630 B2 11/2015 Sharif et al.
9,231,933 B1 1/2016 Shenoy et al.
9,252,958 B1 * 2/2016 Tempel ................. H04L 9/3271
9,485,101 B2 11/2016 Bowen
9,660,978 B1 5/2017 Truskovsky et al.
9,680,813 B2 6/2017 Sade et al.
9,794,249 B1 10/2017 Truskovsky et al.
9,882,727 B1 1/2018 Veladanda et al.
10,021,084 B2 7/2018 Matthews et al.
10,212,147 B2 2/2019 Buendgen et al.
10,425,401 B1 9/2019 Pecen et al.
10,439,825 B1 10/2019 Meyer et al.
10,447,683 B1 10/2019 Loladia et al.
10,469,518 B1 11/2019 Natanzon et al.
10,621,577 B2 4/2020 Castinado et al.
10,652,030 B1 5/2020 Levy et al.
10,764,263 B2 9/2020 Rossi
10,771,261 B1 9/2020 Lazar et al.
10,812,276 B2 10/2020 Bojjireddy et al.
10,848,323 B2 11/2020 Barr, III et al.
11,153,103 B2 10/2021 Fynaardt et al.
11,190,504 B1 11/2021 Ah Kun et al.
11,196,570 B2 12/2021 Borne-Pons et al.
11,310,059 B2 4/2022 Leibmann et al.
11,362,843 B1 6/2022 Jiang et al.
11,368,314 B2 6/2022 Ray et al.
11,388,594 B2 7/2022 Uy et al.
11,438,325 B2 9/2022 Begun et al.
11,477,011 B1 10/2022 Pelton et al.
11,533,185 B1 12/2022 Sharma et al.
11,627,123 B2 4/2023 Stayskal et al.
11,706,038 B1 7/2023 Thakore et al.
11,706,207 B1 7/2023 Fynaardt
11,888,997 B1 1/2024 Bowen et al.
12,088,738 B2 9/2024 Rosenthol et al.
12,323,466 B1 6/2025 Miseiko et al.
12,361,110 B1 7/2025 Subramanian et al.
12,380,443 B1 8/2025 Edwards et al.
2002/0007346 A1 1/2002 Qiu et al.
2002/0029200 A1 3/2002 Dulin et al.
2002/0174066 A1 11/2002 Kleckner et al.
2003/0037234 A1 2/2003 Fu et al.
2006/0047965 A1 3/2006 Thayer
2006/0101510 A1 5/2006 Kadyk et al.
2007/0005956 A1 1/2007 Zilinskas et al.
2007/0016782 A1 1/2007 Crall et al.
2007/0147619 A1 6/2007 Bellows et al.
2010/0030897 A1 2/2010 Stradling
2010/0325429 A1 12/2010 Saha et al.
2011/0113239 A1 5/2011 Fu et al.
2011/0238986 A1 9/2011 Kherani et al.
2012/0036220 A1 2/2012 Dare et al.
2012/0240192 A1 9/2012 Orazi et al.
2012/0246466 A1 9/2012 Salvarani et al.
2012/0278614 A1 11/2012 Choi
2013/0086642 A1 4/2013 Resch et al.
2013/0179676 A1 7/2013 Hamid
2013/0262857 A1 10/2013 Neuman et al.
2014/0298419 A1 10/2014 Boubez et al.
2014/0354405 A1 * 12/2014 Kocher ................... G06F 21/32
340/5.82
2015/0095995 A1 4/2015 Bhalerao
2015/0135299 A1 5/2015 Liang et al.
2015/0215308 A1 7/2015 Manolov et al.
2015/0279132 A1 10/2015 Perotti
2015/0288528 A1 10/2015 Cho et al.
2015/0334110 A1 11/2015 Bishop et al.
2015/0381374 A1 12/2015 Lszlo
2016/0277923 A1 9/2016 Steffey et al.
2016/0352521 A1 * 12/2016 Choi .................... H04L 9/3247
2017/0039373 A1 2/2017 Sasin et al.
2017/0126667 A1 5/2017 Bishop et al.
2017/0171191 A1 6/2017 Cignetti et al.
2017/0177324 A1 6/2017 Frank et al.
2017/0222981 A1 8/2017 Srivastav et al.
2017/0279807 A1 9/2017 Bermdez
2017/0317837 A1 11/2017 Alrawais et al.
2017/0338967 A1 11/2017 Lewison et al.
2017/0373860 A1 12/2017 Kshirsagar et al.
2018/0019993 A1 1/2018 Kravitz et al.
2018/0083966 A1 3/2018 Zhou et al.
2018/0102904 A1 4/2018 Lin et al.
2018/0287804 A1 10/2018 Geisbush
2019/0026804 A1 1/2019 Yin
2019/0149342 A1 5/2019 Fynaardt et al.
2019/0165950 A1 5/2019 Ibrahim
2019/0166635 A1 5/2019 Mccolgan et al.
2019/0347406 A1 11/2019 Lev-Ran et al.
2019/0349402 A1 11/2019 Shukla et al.
2019/0356494 A1 11/2019 Chmara et al.
2019/0356817 A1 11/2019 Bush et al.
2019/0363895 A1 11/2019 Barr et al.
2019/0372783 A1 12/2019 Martinez et al.
2020/0021575 A1 1/2020 Rezvani et al.
2020/0092095 A1 3/2020 Yang et al.
2020/0150972 A1 5/2020 Ketkar et al.
2020/0274718 A1 8/2020 Hwang et al.
2020/0274862 A1 8/2020 Varvarezis et al.
2020/0382323 A1 12/2020 Keselman et al.
2020/0396089 A1 12/2020 Guo et al.
2021/0034767 A1 2/2021 Free et al.
2021/0051028 A1 2/2021 Kapon et al.
2021/0126801 A1 4/2021 Nix
2021/0144017 A1 * 5/2021 Li ......................... H04L 9/3239
2021/0152547 A1 5/2021 Barhudarian et al.
2021/0211307 A1 7/2021 Statia et al.
2021/0218723 A1 7/2021 Lekov et al.
2021/0274348 A1 9/2021 Yoon et al.
2021/0297259 A1 9/2021 Rahn et al.
2021/0328814 A1 10/2021 Wei et al.
2021/0392002 A1 12/2021 Gray et al.
2021/0409403 A1 12/2021 Lewin et al.
2021/0409409 A1 12/2021 Palanisamy
2022/0014522 A1 1/2022 Thomas et al.
2022/0029988 A1 1/2022 Levin et al.
2022/0038894 A1 2/2022 Yoon et al.
2022/0116229 A1 4/2022 Jones et al.
2022/0123951 A1 4/2022 Lutz et al.
2022/0141004 A1 5/2022 Murray
2022/0141085 A1 5/2022 Singhal et al.
2022/0150238 A1 5/2022 Bhalerao
2022/0239503 A1 7/2022 Mallikarjuna et al.
2022/0264301 A1 8/2022 Martinez et al.
2022/0393886 A1 12/2022 Williams et al.
2023/0007474 A1 1/2023 Ni et al.
2023/0032867 A1 2/2023 Peddada et al.
2023/0049095 A1 2/2023 Rangaraj
2023/0062888 A1 3/2023 Colombano
2023/0109231 A1 4/2023 Adogla et al.
2023/0121514 A1 4/2023 Smith
2023/0208655 A1 6/2023 Statia et al.
2023/0237155 A1 7/2023 Jacquin et al.
2023/0239163 A1 * 7/2023 Liu ....................... H04L 9/3247
713/168
2023/0291574 A1 9/2023 Held et al.
2023/0291577 A1 9/2023 Thai et al.
2023/0401307 A1 12/2023 Pop et al.
2023/0412397 A1 12/2023 Gollent et al.
2024/0015508 A1 1/2024 Yoon et al.
2024/0020373 A1 1/2024 Ivanov et al.
2024/0031146 A1 1/2024 Marosi-Bauer et al.
2024/0097919 A1 3/2024 Qiu et al.
2024/0104192 A1 3/2024 Kalle et al.
2024/0106886 A1 3/2024 Roy et al.
2024/0121603 A1 4/2024 Yoon et al.
2024/0146543 A1 5/2024 Sahoo et al.
2024/0333640 A1 10/2024 Shevade et al.
2024/0356763 A1 10/2024 Goldberg et al.
2024/0364540 A1 10/2024 Sai et al.
2024/0372731 A1 11/2024 Kobel et al.
2024/0388510 A1 11/2024 Madtha et al.
2024/0427642 A1 12/2024 Punreddy et al.
2024/0430249 A1 12/2024 Singh et al.

(56) References Cited

U.S. PATENT DOCUMENTS

2025/0030561 A1 1/2025 Long et al.
2025/0097211 A1 3/2025 Uzun et al.
2025/0133401 A1 4/2025 Lee et al.

FOREIGN PATENT DOCUMENTS

| | | | |
|---|---|---|---|
| EP | 1251670 | A2 | 10/2002 |
| EP | 2267970 | A2 | 12/2010 |
| EP | 2854349 | A1 | 4/2015 |
| EP | 4000296 | A1 | 5/2022 |
| EP | 3772208 | B1 | 9/2024 |
| KR | 10-2011-0045459 | A | 5/2011 |
| WO | 2006/122024 | A2 | 11/2006 |
| WO | 2007/117293 | A2 | 10/2007 |
| WO | 2022/103890 | A1 | 5/2022 |
| WO | 2022/121461 | A1 | 6/2022 |
| WO | 2022/133026 | A1 | 6/2022 |
| WO | 2023/240360 | A1 | 12/2023 |
| WO | 2025/059187 | A1 | 3/2025 |

OTHER PUBLICATIONS

Yi, Seunghee, (WO2023/227228 , "Method and Apparatus for Canary deployment in Gnodeb,"), Nov. 30. 2023. pp. 1-17. (Year: 2023).
"About Azure Key Vault certificates", Retrieved from https://learn.microsoft.com/en-us/azure/key-vault/certificates/about-certificates, Feb. 8, 2023, pp. 1-8.
"About the Expressway", Aug. 17, 2022. pp. 1-12.
"Automated certificate management for TLS certificates", Retrieved from https://docs.servicenow.com/en-US/bundle/utah-it-operations-management/page/product/discovery/concept/automated-cert-requests.html, Retrieved on May 4, 2023, pp. 1-4.
"AWS Certificate Manager FAQs", Retrieved from https://aws.amazon.com/certificate-manager/faqs/, Retrieved on Mar. 24, 2023, pp. 1-17.
"Azure Instance Metadata Service", Retrieved from https://learn.microsoft.com/en-us/azure/virtual-machines/instance-metadata-service?tabs=windows, Mar. 15, 2023, pp. 1-42.
"Cisco Expressway Certificate Creation and Use Deployment Guide", Feb. 23, 2021, p. 10.
"Deploying the CA bundle iApp", Retrieved from https://www.f5.com/pdf/deployment-guides/f5-ca-bundle-dg.pdf, Dec. 14, 2017, pp. 1-9.
"DigiCert Public Key Infrastructure (PKI) Platform", 2019, p. 15.
"Get started with Key Vault certificates", Retrieved from https://learn.microsoft.com/en-us/azure/key-vault/certificates/certificate-scenarios, Retrieved on Feb. 1, 2023, pp. 1-6.
"High Availability using Patching and Rolling AP Upgrade on Cisco Catalyst 9800 Wireless Controllers", Copyright 2020, pp. 1-41.
"Manage Certificate Revocation Lists (CRLs)", Jul. 23, 2021, pp. 1-4.
"PKI secrets engine", Retrieved from https://developer.hashicorp.com/vault/docs/secrets/pki, Retrieved on May 4, 2023, pp. 1-3.
"Planning a certificate revocation list (CRL)", Retrieved from https://docs.aws.amazon.com/privateca/latest/userguide/crl-planning.html, Retrieved on Jul. 28, 2023, p. 11.
"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.
"Release Your App Update in a Staged Rollout", Retrieved from https://developer.amazon.com/docs/app-submission/release-updates-in-staged-rollouts.html, Retrieved on Apr. 27, 2023, pp. 1-18.
"Rotate Security Certificates", Retrieved from https://www.cockroachlabs.com/docs/stable/rotate-certificates, Retrieved on May 4, 2023, pp. 1-6.
"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.
"Staged upgrade", Retrieved from https://www.ibm.com/docs/en/order-management-sw/9.4.0?topic=migrating-staged-upgrade, Mar. 2, 2021, pp. 1-3.
"Troubleshoot SSL certificates", Retrieved from https://cloud.google.com/load-balancing/docs/ssl-certificates/troubleshooting, Retrieved on Mar. 24, 2023, pp. 1-8.
"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.
"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.
"Updating your private CA", Retrieved from https://docs.aws.amazon.com/privateca/latest/userguide/PCAUpdateCA.html, Retrieved on Mar. 24, 2023, pp. 1-4.
"Use self-managed SSL certificates", Retrieved from https://cloud.google.com/load-balancing/docs/ssl-certificates/self-managed-certs, Aug. 15, 2023, p. 13.
"vSphere Security", vmware, Update 3, Mar. 21, 2023, pp. 1-426.
"Working with Hosts", Retrieved from https://docs.cloudstack.apache.org/projects/archived-cloudstack-administration/en/latest/hosts.html, Retrieved on Mar. 24, 2023, pp. 1-7.
Atutxa et al., "Improving efficiency and security of IIoT communications using in-network validation of server certificate", Computers in Industry, vol. 144, Jan. 2023, 103802, p. 30.
Bigelow S.J., "Rolling deployment", Retrieved from https://www.techtarget.com/searchitoperations/definition/rolling-deployment, Jan. 2023, p. 4.
Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.
Ghanmi et al., "A Secure Data Storage in Multi-cloud Architecture Using Blowfish Encryption Algorithm", Advanced Information Networking and Applications, Mar. 2022, pp. 398-408.
Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.
Manjusha R. et al., "Secure Authentication and Access System for Cloud Computing Auditing Services Using Associated Digital Certificate", Indian Journal of Science and Technology, vol. 8 (S7), Apr. 2015, pp. 220-227.
Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, p. 10.
Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.
Subhayu, "Different Phases of a Certificate Lifecycle Management Process for a secure WPA2-Enterprise network", Certificate Lifecycle Management Oct. 6, 2022, p. 16.
Ylonen et al., "Security of Automated Access Management Using Secure Shell (SSH)", NISTIR 7966 (Draft), Aug. 2014, p. 43.
Bingyu Li et al., Locally-Centralized Certificate Validation and Its Application in Desktop Virtualization Systems, Nov. 2, 2020, IEEE, vol. 16, pp. 1380-1395. (Year: 2020).
Jude Nelson et al., Syndicate: Virtual Cloud Storage through Provider Composition, Jun. 23, 2014, ACM, pp. 1-8. (Year: 2014).
Kathleen Nichols et al., Trust Schemas and ICN: Key to Secure Home IoT, Sep. 22, 2021, ACM, pp. 95-106. (Year: 2021).
Albert Wasef et al., DCS: An Efficient Distributed-Certificate-Service Scheme for Vehicular Networks, Feb. 2010, IEEE, vol. 59, Issue: 2, pp. 533-549. (Year: 2010).
Artem Dinaburg et al., Ether: Malware Analysis via Hardware Virtualization Extensions, Oct. 27, 2008, ACM, pp. 51-62. (Year: 2008).
Capt James M. Hayes, Secure In-band Update of Trusted Certificates, Aug. 6, 2002, IEEE, pp. 1-6. (Year: 2002).
Kumagai et al., "Distributed Public Key Certificate-Issuing Infrastructure for Consortium Certificate Authority Using Distributed

(56) References Cited

OTHER PUBLICATIONS

Ledger Technology", Security and Communication Networks, vol. 2023, Article ID 9559439, Jun. 7, 2023, pp. 1-20.
Marco Anisetti et al., Test-Based Security Certification of Composite Services, Dec. 4, 2018, vol. 13, Issue 1, pp. 1-43. (Year: 2018).
Yu et al., "A Cloud Certificate Authority Architecture for Virtual Machines with Trusted Platform Module", 2015 IEEE 17th International Conference on High Performance Computing and Communications, 2015 IEEE 7th International Symposium on Cyberspace Safety and Security, and 2015 IEEE 12th International Conference on Embedded Software and Systems, 2015, pp. 1377-1380.
M. S. Zefreh, A. Fanian, S. M. Sajadieh, M. Berenjkoub and p. Khadivi, "A Distributed Certificate Authority and Key Establishment Protocol for Mobile Ad Hoc Networks," 2008 10th International Conference on Advanced Communication Technology, Gangwon, Korea (South), 2008, pp. 1157-1162. (Year: 2008).

* cited by examiner

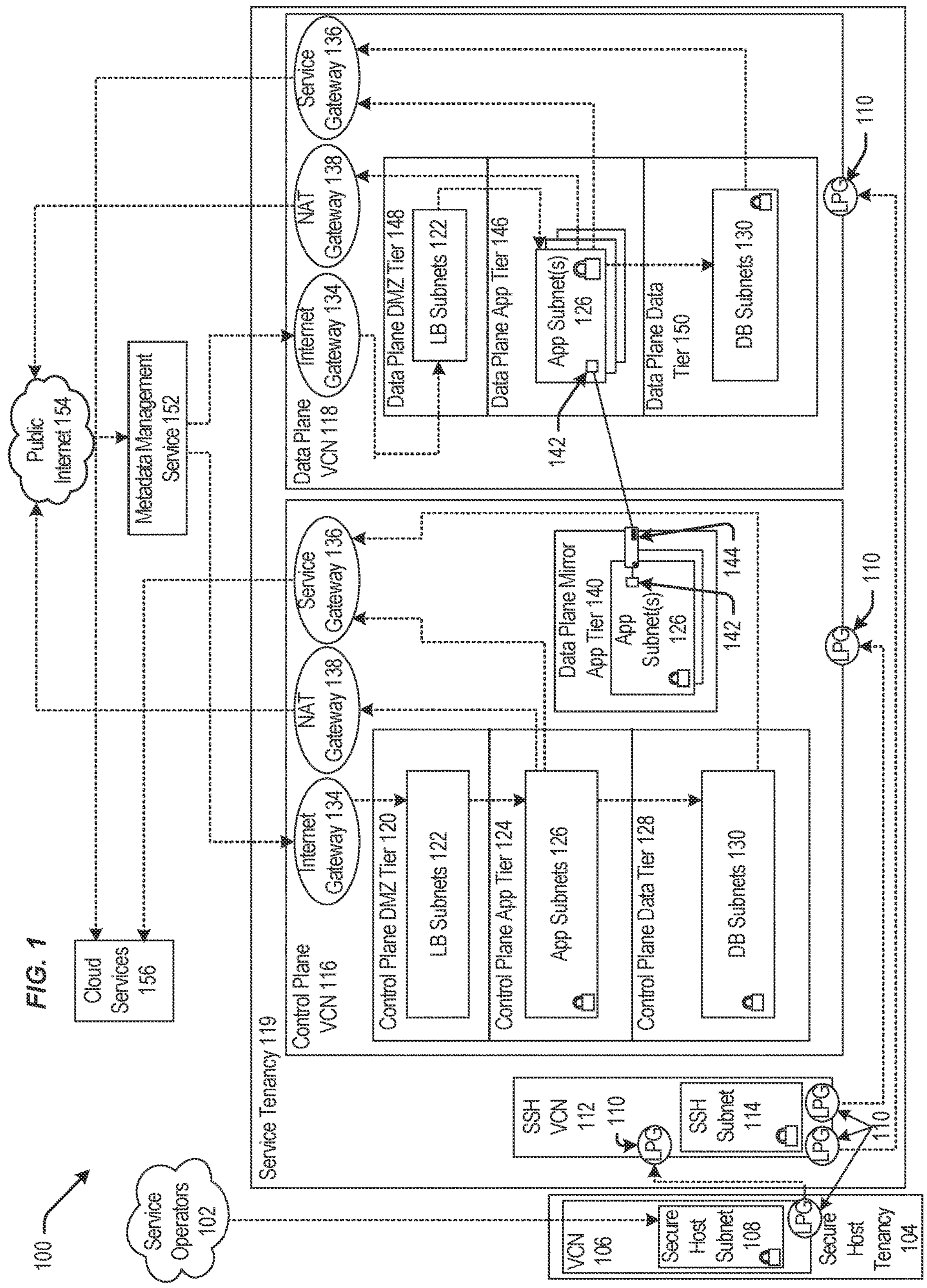

FIG. 1
100
Service Operators 102
Cloud Services 156
Public Internet 154
Metadata Management Service 152
Service Tenancy 119
Control Plane VCN 116
Internet Gateway 134
NAT Gateway 138
Service Gateway 136
Control Plane DMZ Tier 120
LB Subnets 122
Control Plane App Tier 124
App Subnets 126
Control Plane Data Tier 128
DB Subnets 130
Data Plane Mirror App Tier 140
App Subnet(s) 126
142
144
Data Plane VCN 118
Internet Gateway 134
NAT Gateway 138
Service Gateway 136
Data Plane DMZ Tier 148
LB Subnets 122
Data Plane App Tier 146
142
App Subnet(s) 126
Data Plane Data Tier 150
DB Subnets 130
SSH VCN 112
110
LPG
SSH Subnet 114
LPG
LPG
110
VCN 106
Secure Host Subnet 108
LPG
Secure Host Tenancy 104
LPG
110
LPG
110

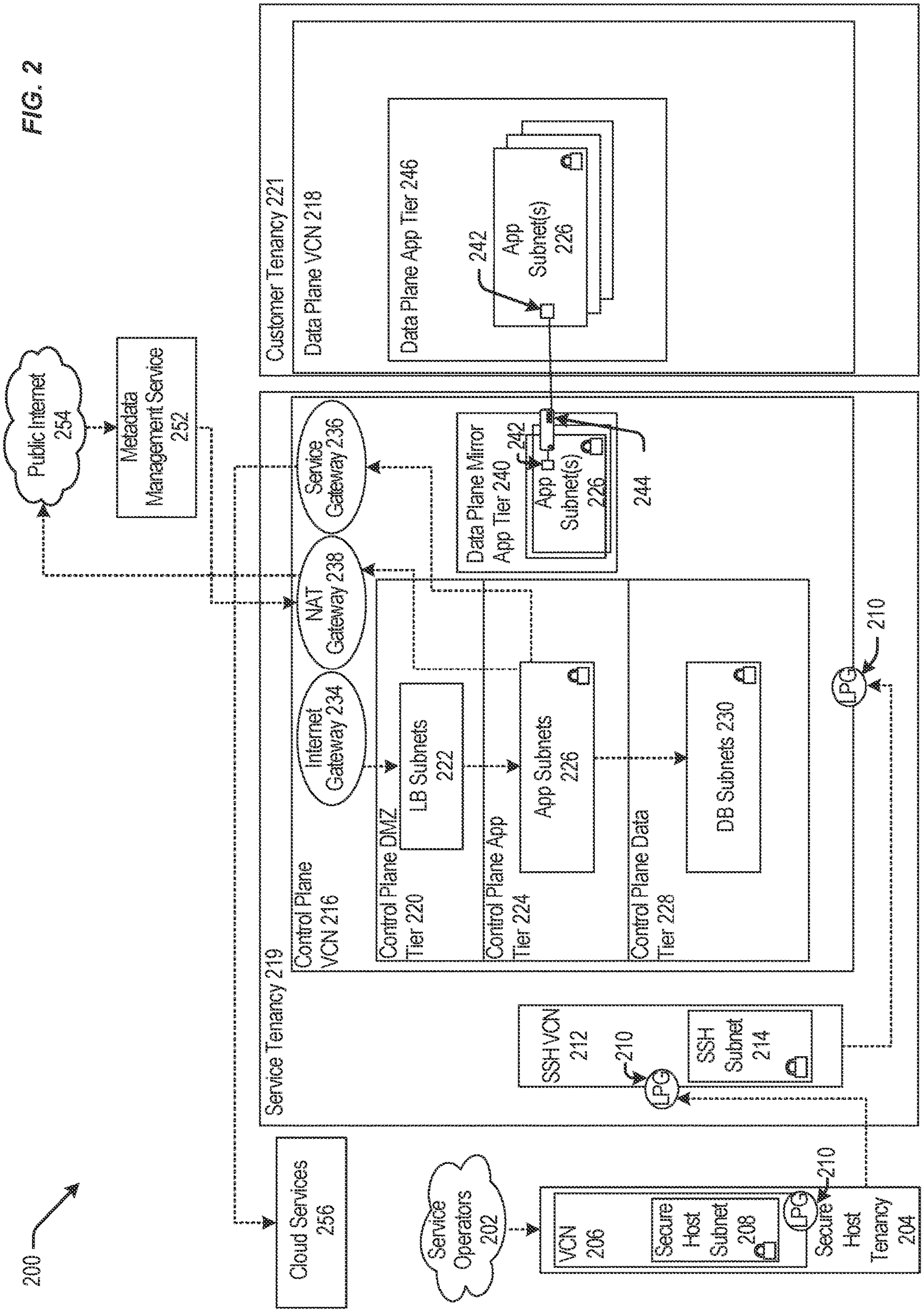

FIG. 2
200
Public Internet 254
Metadata Management Service 252
Cloud Services 256
Service Operators 202
VCN 206
Secure Host Subnet 208
LPG
210
Secure Host Tenancy 204
Service Tenancy 219
SSH VCN 212
SSH Subnet 214
Control Plane VCN 216
Internet Gateway 234
NAT Gateway 238
Service Gateway 236
Control Plane DMZ Tier 220
LB Subnets 222
Control Plane App Tier 224
App Subnets 226
Control Plane Data Tier 228
DB Subnets 230
Data Plane Mirror App Tier 240
App Subnet(s) 226
242
244
Customer Tenancy 221
Data Plane VCN 218
Data Plane App Tier 246

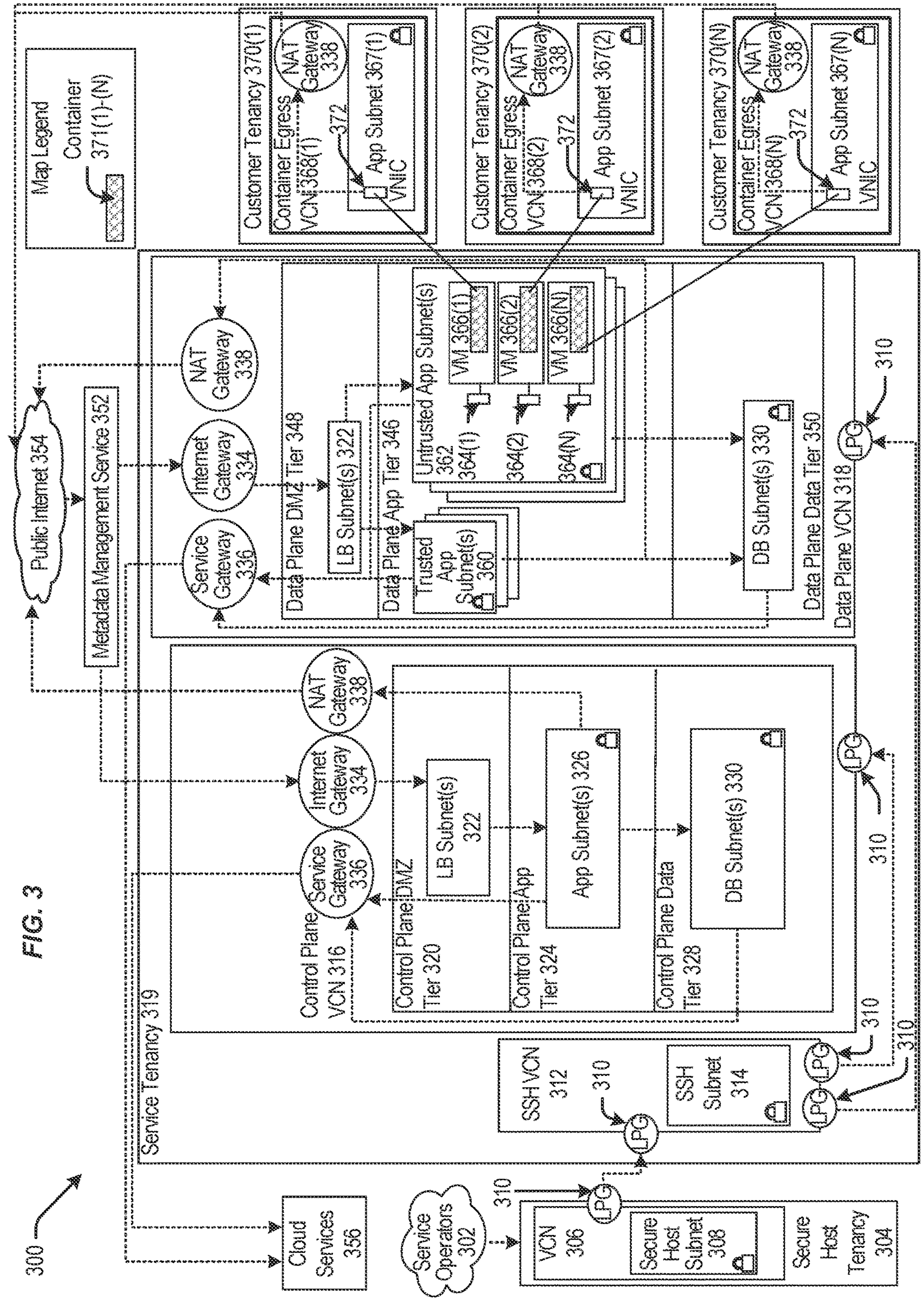

FIG. 3
300
Map Legend
Container 371(1)-(N)
Public Internet 354
Metadata Management Service 352
Cloud Services 356
Service Operators 302
VCN 306
Secure Host Subnet 308
Secure Host Tenancy 304
LPG
310
Service Tenancy 319
SSH VCN 312
SSH Subnet 314
Control Plane VCN 316
Service Gateway 336
Internet Gateway 334
NAT Gateway 338
Control Plane DMZ Tier 320
LB Subnet(s) 322
Control Plane App Tier 324
App Subnet(s) 326
Control Plane Data Tier 328
DB Subnet(s) 330
Data Plane VCN 318
Data Plane DMZ Tier 348
Data Plane App Tier 346
Data Plane Data Tier 350
Trusted App Subnet(s) 360
Untrusted App Subnet(s) 362
364(1)
364(2)
364(N)
VM 366(1)
VM 366(2)
VM 366(N)
Customer Tenancy 370(1)
Customer Tenancy 370(2)
Customer Tenancy 370(N)
Container Egress VCN 368(1)
Container Egress VCN 368(2)
Container Egress VCN 368(N)
App Subnet 367(1)
App Subnet 367(2)
App Subnet 367(N)
VNIC
372

400

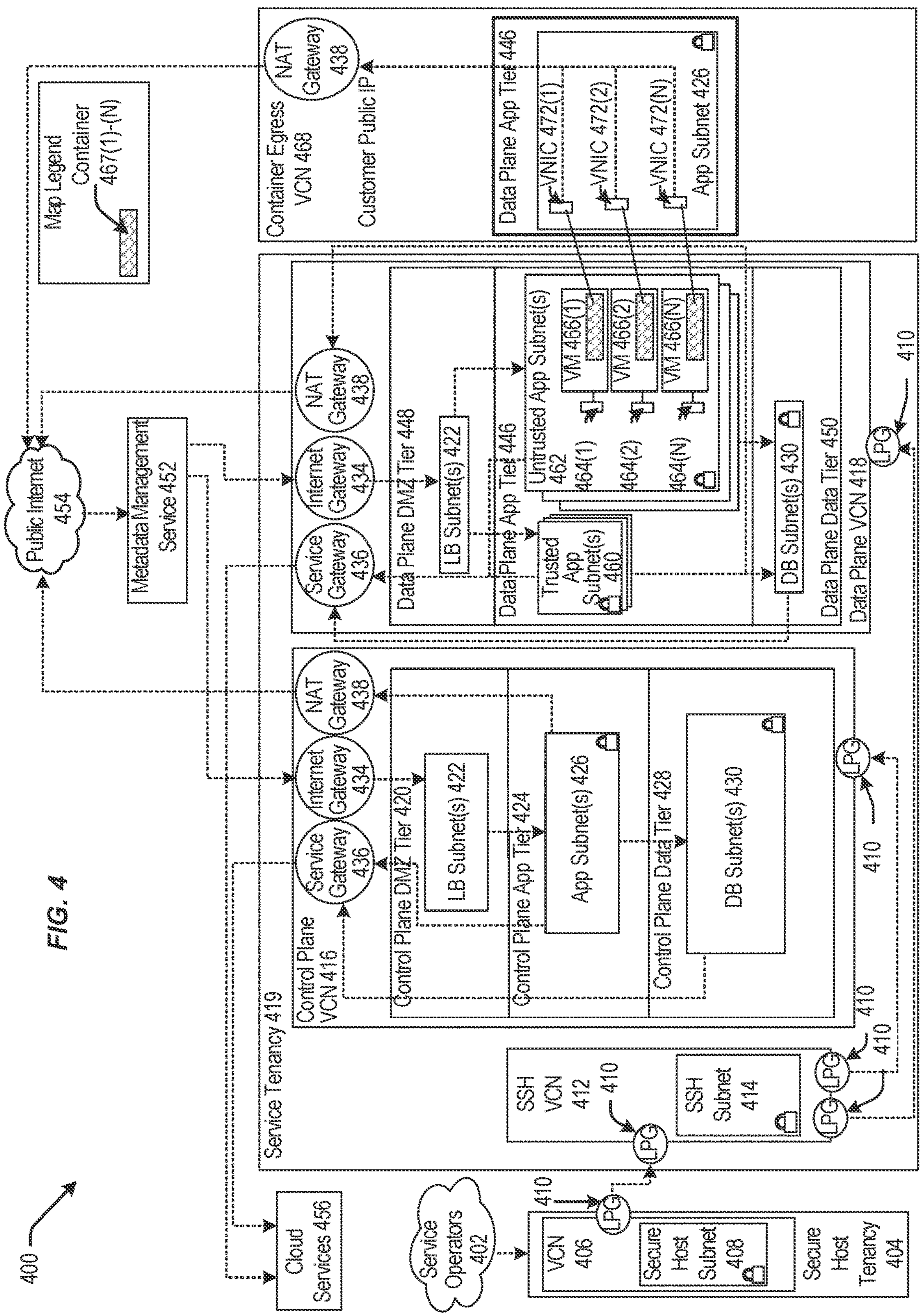

FIG. 4
Public Internet 454
Metadata Management Service 452
Map Legend
Container 467(1)-(N)
Cloud Services 456
Service Tenancy 419
Control Plane VCN 416
Service Gateway 436
Internet Gateway 434
NAT Gateway 438
Control Plane DMZ Tier 420
LB Subnet(s) 422
Control Plane App Tier 424
App Subnet(s) 426
Control Plane Data Tier 428
DB Subnet(s) 430
Data Plane DMZ Tier 448
Data Plane App Tier 446
Trusted App Subnet(s) 460
Untrusted App Subnet(s) 462
464(1)
464(2)
464(N)
VM 466(1)
VM 466(2)
VM 466(N)
Data Plane Data Tier 450
Data Plane VCN 418
Container Egress VCN 468
Customer Public IP
VNIC 472(1)
VNIC 472(2)
VNIC 472(N)
App Subnet 426
Service Operators 402
VCN 406
Secure Host Subnet 408
Secure Host Tenancy 404
SSH VCN 412
SSH Subnet 414
LPG
410

VALIDATING CERTIFICATE BUNDLES WITH ASYMMETRIC KEYS

TECHNICAL FIELD

The present disclosure relates to distribution of certificate bundles that include digital certificates. More particularly, the present disclosure relates to the use of asymmetric keys to digitally sign and validate certificate bundles that include digital certificates.

BACKGROUND

A virtual cloud network includes network entities that communicate with one another. Communications between network entities may be performed in accordance with a security protocol whereby network entities authenticate one another by presenting a digital certificate. When a network entity presents a valid digital certificate to another network entity, the other network entity can trust that it is communicating with the network entity, as opposed to some unknown entity, based on a trust relationship with the CA that issued the digital certificate.

A digital certificate may be issued to a network entity by a CA. The digital certificate may include a digital signature generated using a private key of the CA that issued the digital certificate. The digital signature can be validated using a CA certificate of the CA that includes a public key corresponding to the private key. Various CA certificates that may be utilized to validate digital certificates issued to various network entities may be included in a certificate bundle. The certificate bundle may be distributed to network entities throughout a virtual cloud network. For example, a certificate bundle may be installed when initializing the virtual cloud network and/or when initializing various network entities on the virtual cloud network. Additionally, a certificate bundle may be updated or replaced from time-to-time, for example, to make new CA certificates available to the network entities and/or to remove old CA certificates.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 1-4 are block diagrams illustrating patterns for implementing a cloud infrastructure as a service system in accordance with one or more embodiments;

DETAILED DESCRIPTION

Figure 5:
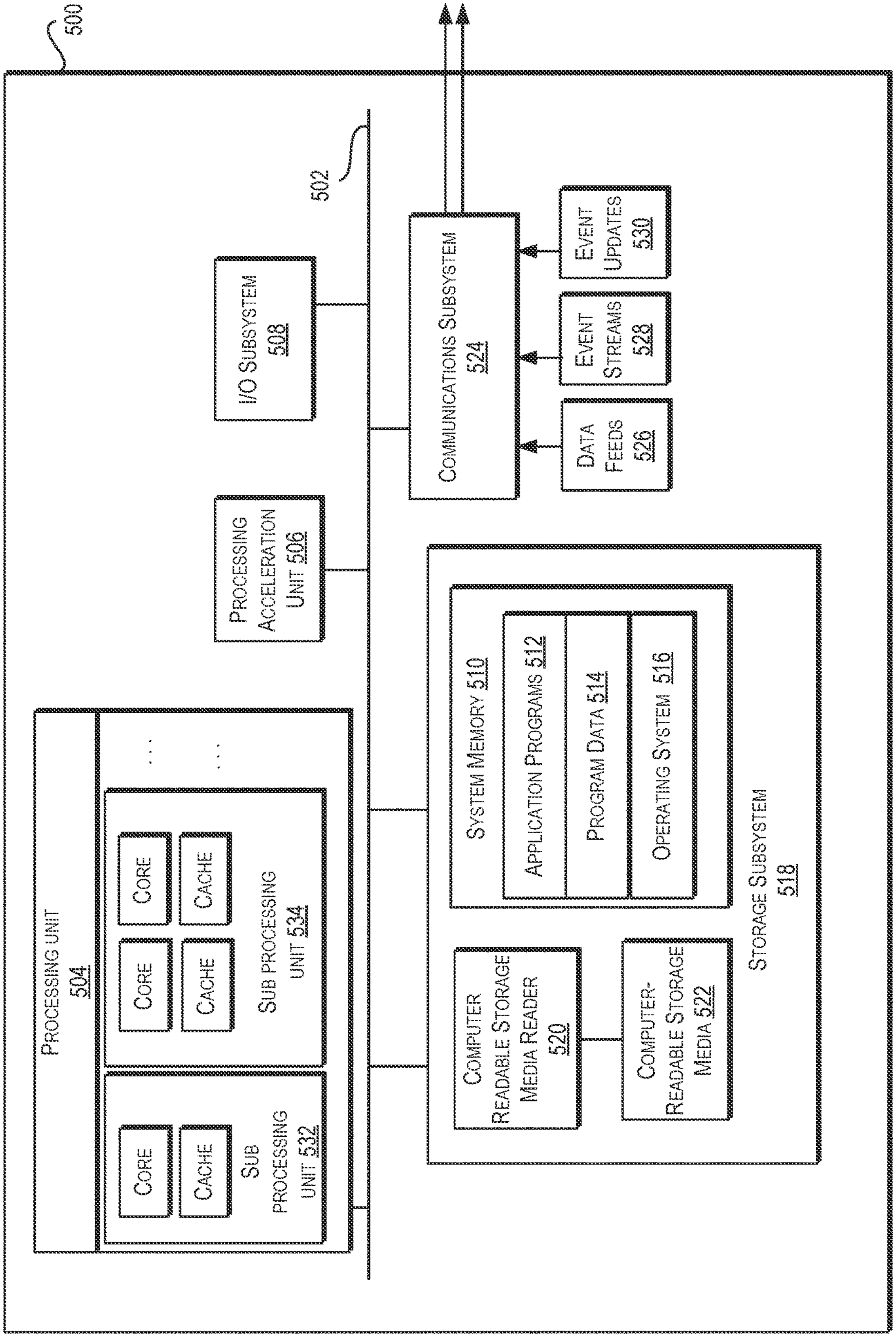
FIG. 5 is a hardware system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CLOUD COMPUTING TECHNOLOGY
3. COMPUTER SYSTEM
4. ARCHITECTURAL OVERVIEW
5. AUTHENTICATING NETWORK ENTITIES
6. EXAMPLE CERTIFICATE BUNDLE DISTRIBUTION PROCESS
7. VALIDATING CERTIFICATE BUNDLES
8. MISCELLANEOUS; EXTENSIONS

1. GENERAL OVERVIEW

One or more embodiments use an asymmetric key pair associated with one or more digital certificates in a current certificate bundle to validate a new certificate bundle. A system may distribute the new certificate bundle along with a digital signature associated with the new certificate bundle. The new certificate bundle may include one or more new digital certificates associated with a new asymmetric key pair. The digital signature may be generated by applying a hash function to the new certificate bundle to obtain a first hash value, and digitally signing the first hash value using a private key of the asymmetric key pair associated with the current certificate bundle.

A system may validate the new certificate bundle by applying the hash function to the new certificate bundle to obtain a second hash value, decrypting the digital signature using a public key of the asymmetric key pair to obtain a third hash value, and comparing the third hash value to the second hash value. A match between the third hash value and the second hash value indicates that the private key utilized to digitally sign the first hash value and the public key used to decrypt the digital signature represent the asymmetric key pair associated with the one or more digital certificates in the currently trusted certificate bundle. Responsive to determining that the third hash value matches the second hash value, the new certificate bundle may be stored in a certificate repository as a trusted certificate bundle. The certificate repository may include a data structure that identifies the new certificate bundle as the trusted certificate bundle. Thus, by digitally signing the new certificate bundle using the private key of the asymmetric key pair associated with the current certificate bundle, trust may be established for the new certificate bundle based on the current certificate bundle.

One or more embodiments described in this Specification and/or recited in the claims may not be included in this General Overview section.

2. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating €: 6 systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. COMPUTER SYSTEM

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. ARCHITECTURAL OVERVIEW

Figure 6A:
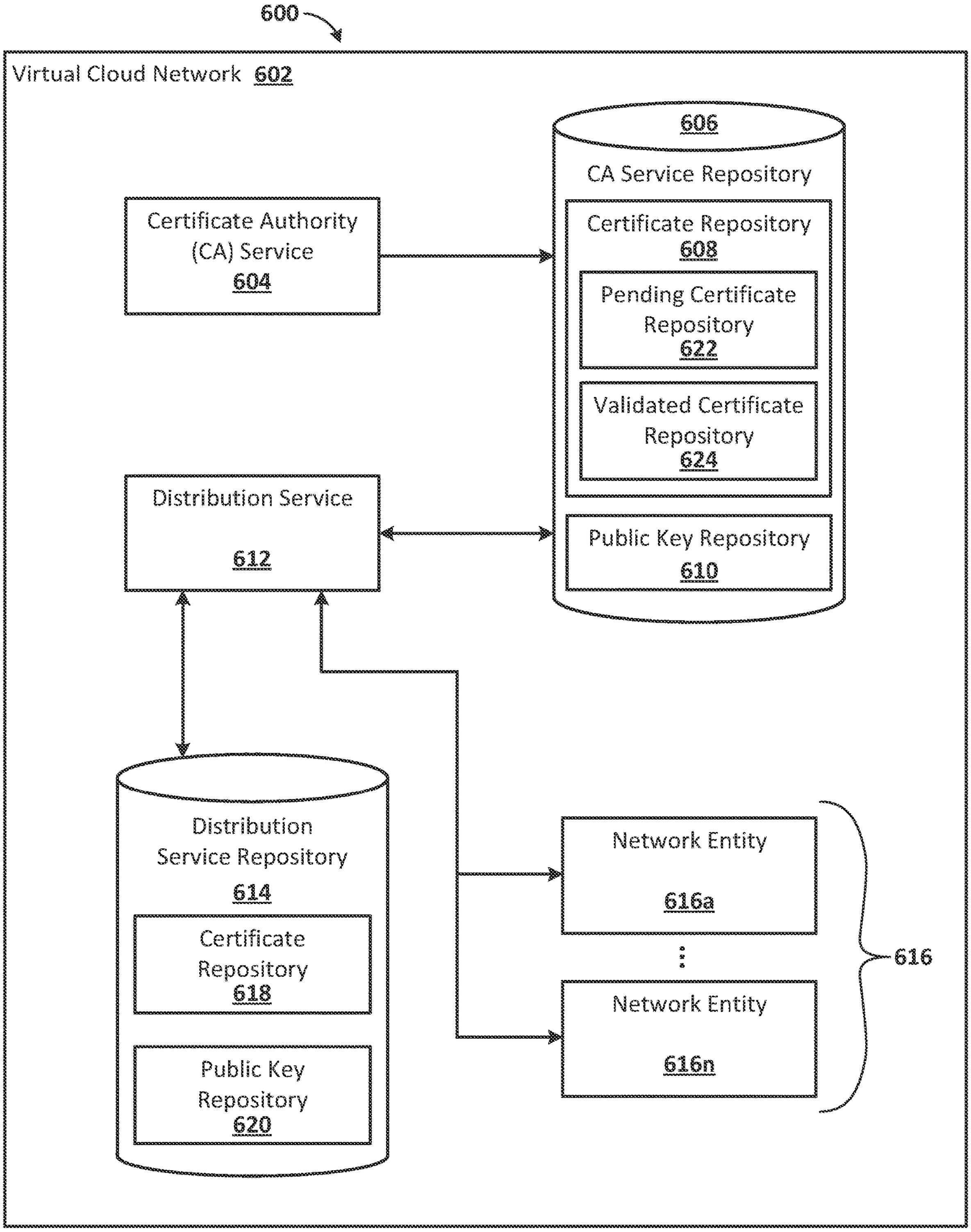
FIGS. 6A and 6B illustrate features of an example system in accordance with one or more embodiments.
Figure 6B:
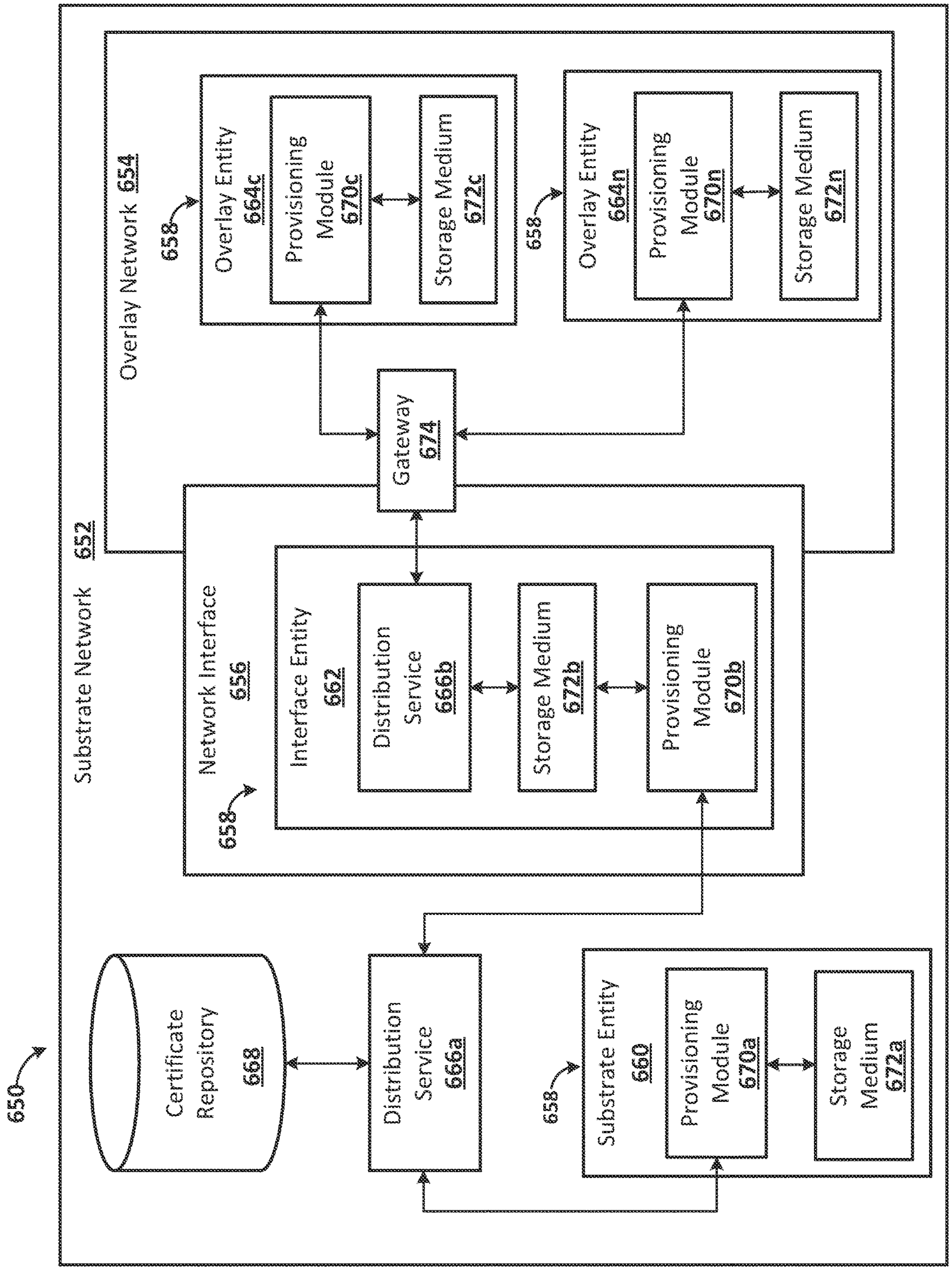

FIGS. 6A and 6B illustrate one example of a system 600 in accordance with one or more embodiments. The system 600 described with reference to FIGS. 6A and 6B may perform operations associated with validating certificate bundles as described herein. The system 600 may also perform operations associated with distributing certificate bundles to network entities as described herein.

As illustrated in FIG. 6A, the system 600 may include a virtual cloud network 602. The virtual cloud network 602 may include a certificate authority (CA) service 604 and a CA service repository 606. The CA service 604 may perform operations including, and/or associated with, generating digital certificates and storing the digital certificates in the CA service repository 606. The digital certificates generated by the CA service 604 and/or stored in the CA service repository 606 may include CA certificates and/or entity certificates. Example CA certificates and example entity certificates are further described below in Section 6, "Authenticating Network Entities." Additionally, or in the alternative, the CA service may perform operations including, and/or associated with, generating asymmetric key pairs that include a private key and a public key. As used herein, the term "asymmetric key pair" refers to a public key and a private key that are associated with one another, such that a digital signature or an encryption generated using the private key may be validated or decrypted using the public key. The public keys may be stored in the CA service repository 606. In one example, a certificate repository 608 and/or a public key repository 610 may be included in, or associated with, the CA service repository 606 may include. The digital certificates generated by the CA service 604 may be stored in the certificate repository 608 included in or associated with the CA service repository 606. The public keys generated by the CA service 604 may be stored in the public key repository 610 included in or associated with the CA service repository 606.

The virtual cloud network 602 may further include a distribution service 612, a distribution service repository 614, and a plurality of network entities 616. The distribution service 612 may perform operations including, and/or associated with, validating digital certificates and storing validated digital certificates in the distribution service repository 614. The distribution service 612 may further perform operations including, and/or associated with, validating public keys and storing validated public keys in the distribution service repository 614. In one example, a certificate repository 618 and/or a public key repository 620 may be included in, or associated with, the distribution service repository 614. The digital certificates validated by the distribution service 612 may be stored in the certificate repository 618 included in, or associated with, the distribution service repository 614. The public keys validated by the distribution service 612 may be stored in the public key repository 620 included in, or associated with, the distribution service repository 614. The distribution service 612 may further perform operations including, and/or associated with, distributing digital certificates to the plurality of network entities 616. For example, the distribution service 612 may distribute to the plurality of network entities 616, digital certificates that have been validated by the distribution service 612.

As shown in FIG. 6A, the CA service repository 606, and/or the certificate repository 608 associated with the CA service repository 606, may include a pending certificate repository 622 and a validated certificate repository 624. The pending certificate repository 622 may include one or more digital certificate that have yet to be validated by the distribution service 612. Additionally, or in the alternative, the pending certificate repository 624 may include one or more certificate bundles that have yet to be validated by the distribution service 612. For example, the one or more certificate bundles in the pending certificate repository 622 may respectively include one or more digital certificate that have yet to be validated by the distribution service 612. The validated certificate repository 624 may include one or more digital certificate that have been validated by the distribution service 612. Additionally, or in the alternative, the validated certificate repository 624 may include one or more certificate bundles that have been validated by the distribution service 612. For example, the one or more certificate bundles may respectively include one or more digital certificate that have been validated by the distribution service 612.

The public key repository 610 may include one or more public keys corresponding to one or more of the digital certificates in the certificate repository. In one example, the one or more public keys may be validated by the distribution service 612. Additionally, or in the alternative, the one or more public keys in the public key repository 610 may correspond to one or more digital certificates that have been validated by the distribution service 612. Additionally, or in the alternative, the public key repository 610 may include one or more public keys that have yet to be validated by the distribution service 612 and/or that correspond to one or more digital certificates that have yet to be validated by the distribution service 612.

The CA service 604 may store digital certificates and/or certificate bundles that include one or more digital certificates in the pending certificate repository 622. The digital certificates and/or certificate bundles stored in the pending certificate repository 622 may include digital certificates and/or certificate bundles generated by the CA service. Additionally, or in the alternative, the digital certificates and/or certificate bundles stored in the pending certificate repository 622 may include digital certificates and/or certificate bundles generated by a third party and made available by the CA service. The CA service 604 may generate and/or update a certificate bundle configuration file that identifies a particular certificate bundle and/or a particular digital certificate stored in the certificate repository 608, such as in the pending certificate repository 622. The certificate bundle configuration file may include a file pointer that identifies a location in the pending certificate repository 622 where the particular certificate bundle and/or the particular digital certificate is stored. The certificate bundle configuration file may be stored in the CA service repository 606 or in the certificate repository 608.

The distribution service 612 may obtain certificate bundles and/or digital certificates from the pending certificate repository 622 for validation. The distribution service 612 may identify a particular certificate bundle and/or a particular digital certificate in the pending certificate repository based on a file pointer in the certificate bundle configuration file. The distribution service 612 may validate a certificate bundle and/or one or more digital certificates obtained from the pending certificate repository 622 and, upon having validated the certificate bundle and/or the one or more digital certificates, the distribution service 612 may store the certificate bundle and/or the one or more digital certificates in the validated certificate repository 624. Additionally, or in the alternative, subsequent to validating a certificate bundle and/or one or more digital certificates, the distribution service 612 may store the certificate bundle and/or the one or more digital certificates in the distribution service repository 614, for example, for distribution to one or more network entities 616 associated with the virtual cloud network 602. In one example, the distribution service 612 may store the certificate bundle and/or the one or more digital certificates for distribution to the one or more network entities 616 in the certificate repository 618 included in, or associated with, distribution service repository 614. The distribution service 612 may generate and/or update a certificate bundle configuration file that identifies a particular certificate bundle and/or a particular digital certificate stored in the validated certificate repository 624 and/or the distribution service repository 614. The certificate bundle configuration file may include a file pointer that identifies a location in the validated certificate repository 624 and/or in the distribution service repository 614 where the particular certificate bundle and/or the particular digital certificate is stored. The certificate bundle configuration file may be stored in the CA service repository 606 or in the distribution service repository 614.

Referring further to FIG. 6A, the CA service may generate one or more digital certificates and/or a certificate bundle that includes one or more digital certificates. The one or more digital certificates may be generated using a private key of an asymmetric key pair. In one example, the CA service may generate the one or more digital certificates using the private key, and then package the one or more digital certificates in a certificate bundle. In another example, the CA service 604 may package the one or more digital certificates as a dataset, and the distribution service 612 may generate a certificate bundle that includes the one or more digital certificates, for example, after validating the dataset in a similar manner to validating a certificate bundle as described herein. After validating such a dataset, the distribution service 612 may generate a certificate bundle that includes the one or more digital certificates and may distribute the certificate bundle to one or more network entities 616.

In one example, the CA service 604 may generate an asymmetric key pair, and, after generating the asymmetric key pair, the CA service 604 may generate one or more digital certificates corresponding to the asymmetric key pair. Additionally, or in the alternative, the CA service may generate a digital certificate based on an asymmetric key pair provided to the CA service from another source, such as from an identity access management service. In one example, the CA service 604 may replace asymmetric key pairs from time to time, for example, in accordance with a security protocol. When an asymmetric key is being replaced, the CA service 604 may also replace the digital certificates associated with the asymmetric key pair that is being replaced with new digital certificates corresponding to the new asymmetric key pair.

After generating the one or more digital certificates and packing the one or more digital certificates in a certificate bundle, the CA service 604 may generate a digital signature associated with the certificate bundle using a private key of an asymmetric key pair. The distribution service 612 may validate the digital signature using a public key of the asymmetric key pair corresponding to the private key that was used to generate the digital signature. The public key may be stored in the public key repository 610. The distribution service 612 may retrieve the public key from the public key repository 610 and use the public key to validate the digital signature. The CA service 604 may generate and/or update a public key configuration file that identifies a particular public key stored in the public key repository 610. The public key configuration file may include a file pointer that identifies a location in the public key repository 610 where the particular public key is stored. The public key configuration file may be stored in the CA service repository 606 or in the public key repository 610.

In one example, the public key that the distribution service 612 uses to validate the digital signature may correspond to an asymmetric key pair associated with an additional set of one or more digital certificates that were generated using the private key of the asymmetric key pair. The additional set of one or more digital certificates may be currently or previously trusted by the distribution service. In one example, the additional set of one or more digital certificates may have been previously validated by the distribution service 612. In one example, the public key used to validate the digital signature may correspond to a private key used to generate the additional set of one or more digital certificates. Additionally, or in the alternative, the public key that the distribution service 612 uses to validate the digital signature may be currently or previously trusted by the distribution service 612, for example, based on a security protocol that may be separate and/or in addition to the validation of digital signatures associated with certificate bundles.

In one example, the CA service 604 may generate the digital signature by applying a first hash function to the certificate bundle to obtain a hash value, and then digitally signing the first hash value using the private key of the asymmetric key pair. In one example, the distribution service 612 may validate the digital signature by determine whether the digital signature was generated using the private key of the asymmetric key pair. The distribution service 612 may determine whether the digital signature was generated using the private key of the asymmetric key pair by applying the hash function to the first certificate bundle associated with the digital certificate to generate a second hash value, decrypting the digital signature to generate a third hash value, and comparing the third hash value to the second hash value. The third hash value matching the second hash value indicates that the private key utilized to digitally sign the first hash value corresponds to the public key used to decrypt the digital signature. The third hash value matching the second hash value indicates that the private key utilized to digitally sign the first hash value and the public key used to decrypt the digital signature represent an asymmetric key pair. The third hash value mismatching the second value may indicate that the private key utilized to digitally sign the first hash value and the public key used to decrypt the digital signature respectively correspond to different asymmetric key pairs.

The additional set of one or more digital certificates may be included in a certificate bundle. Alternatively, the additional set of one or more digital certificates may be included in a dataset to be packaged into a certificate bundle, or the set of one or more digital certificates may be stand-alone digital certificates. The additional set of one or more digital certificates may include one or more CA certificates and/or one or more entity certificates. In one example, the additional set of one or more digital certificates may be nearing expiration or currently expired. In one example, the additional set of one or more digital certificates may be expired, and may have been previously trusted prior to expiring. In one example, the additional set of one or more digital certificates may be expired, and may be trusted except for having expired. In one example, the additional set of one or more digital certificates may be replaced with a new set of one or more digital certificates. The new set of one or more digital certificates may be generated using a new private key of a new asymmetric key pair. The new set of one or more digital certificates may include a new public key corresponding to the new private key of the new asymmetric key pair.

The distribution service 612 may periodically poll the pending certificate repository 622 for a pending certificate bundle that is awaiting validation. The distribution service 612 may determine, based at least in part on polling the pending certificate repository 622, that a pending certificate bundle is stored in the pending certificate repository 622 and is awaiting validation. In one example, the distribution service may poll a certificate bundle configuration file to determine if the certificate bundle configuration file includes a file pointer that points to a certificate bundle stored in the pending certificate repository 622 that is awaiting validation. Responsive to determining that a pending certificate bundle is stored in the pending certificate repository 622 and is awaiting validation, the distribution service 612 may download the pending certificate bundle and the digital signature associated with the pending certificate bundle. Additionally, or in the alternative, the distribution service 612 may receive a notification that a pending certificate bundle is available in the pending certificate repository 622. Responsive to receiving the notification, the distribution service 612 may download the pending certificate bundle and the digital signature associated with the pending certificate bundle from the pending certificate repository. Upon having received the pending certificate bundle and the digital signature associated with the pending certificate bundle, the distribution service 612 may proceed with validating the pending certificate bundle.

In one example, the pending certificate repository 622 may include a first certificate bundle that includes a first set of one or more digital certificates. The first set of one or more digital certificates may include a first set of one or more first CA certificates. The first certificate bundle may be awaiting validation by the distribution service 612. The first set of one or more digital certificates may have been generated by the CA service using a first private key associated with a first asymmetric key pair. A first public key corresponding to the first asymmetric key pair may be included in at least one first digital certificate of the first set of one or more digital certificates. Additionally, or in the alternative, the first public key may be stored in the pending certificate repository 622 or in the public key repository 610, for example, in a data structure that associates the first public key with the first certificate bundle and/or the first set of one or more digital certificates. Additionally, the pending certificate repository 622 may include a first digital signature associated with the first certificate bundle. The first digital signature may be stored in the pending certificate repository 622 in a data structure that associates the first digital signature with the first certificate bundle.

In one example, the validated certificate repository 624 may include a second set of one or more digital certificates and/or a second certificate bundle that includes a second set of one or more digital certificates. The second set of one or more digital certificates may include a second set of one or more second CA certificates. The second certificate bundle and/or the second set of one or more digital certificates may have been previously validated by the distribution service 612. Additionally, or in the alternative, the second certificate bundle and/or the second set of one or more digital certificates may be currently or previously trusted by the distribution service 612. The second set of one or more digital certificates may have been generated by the CA service using a second private key of a second asymmetric key pair. A second public key of the second asymmetric key pair may be included in at least one second digital certificate of the second set of one or more digital certificates. Additionally, or in the alternative, the second public key may be stored in the public key repository 610, for example, in a data structure that associates the second public key with the second certificate bundle and/or the second set of one or more digital certificates.

The private key used by the CA service 604 to generate the first digital signature associated with the first certificate bundle may be the second private key of the second asymmetric key pair. The distribution service 612 may validate the first digital signature using the second public key of the second asymmetric key pair associated with the second set of one or more digital certificates and/or the second certificate bundle. The second public key may be stored in the public key repository 610. The distribution service 612 may retrieve the second public key from the public key repository 610 and may use the second public key to validate the digital signature. In one example, the distribution service 612 may identify a file pointer, in a public key configuration file, that points to the second public key in the public key repository, and the distribution service 612 may retrieve the second public key from the public key repository based on the file pointer. The public key configuration file may be stored in the CA service repository 606 or in the public key repository 610. The distribution service 612 may determine, using the second public key, that the digital signature was generated using the second private key of the second asymmetric key pair. Responsive to determining that the digital signature was generated using the second private key, the distribution service 612 may store the first certificate bundle in the validated certificate repository 624 as a trusted certificate bundle. The validated certificate repository 624 may include a data structure that identifies the first certificate bundle as the trusted certificate bundle. Additionally, or in the alternative, the distribution service 612 may store the first certificate bundle in the certificate repository 618 associated with the distribution service repository 614 as a trusted certificate bundle. The certificate repository 618 may include a data structure that identifies the first certificate bundle as the trusted certificate bundle.

In one example, the distribution service 612 may store the first certificate bundle in the certificate repository 618 in a data structure that identifies the first certificate bundle as a current certificate bundle. Identifying the first certificate bundle as a current certificate bundle may include identifying the first certificate bundle as a trusted certificate bundle. The identification of the first certificate bundle as the current certificate bundle may indicate that the first certificate bundle is currently available for distribution to one or more network entities 616 associated with the virtual cloud network 602. Additionally, or in the alternative, the identification of the first certificate bundle as the current certificate bundle may indicate that the first certificate bundle is the latest version of one or more certificate bundles that are available for distribution to the one or more network entities 616. In one example, prior to storing the first certificate bundle in the certificate repository 618, the certificate repository 618 may include a second certificate bundle that includes the second set of one or more digital certificates. The certificate repository 618 may include a data structure that identifies the second certificate bundle as a current certificate bundle. In one example, the distribution service 612 may update the data structure to identify the second certificate bundle as a previous certificate bundle. The identification of the second certificate bundle as the previous certificate bundle may indicate that the second certificate bundle is an earlier version with respect to one or more certificate bundles that are available for distribution to the one or more network entities 616, such as with respect to the first certificate bundle and/or another current certificate bundle. Additionally, or in the alternative, the identification of the second certificate bundle as the previous certificate bundle may indicate that the second certificate bundle is scheduled to be removed from distribution, and/or that the second certificate bundle is no longer available for distribution, to one or more network entities 616 associated with the virtual cloud network 602. Additionally, or in the alternative, identifying the second certificate bundle as the previous certificate bundle may include identifying the second certificate bundle as an untrusted certificate bundle.

After storing the first certificate bundle in the validated certificate repository 624 and/or in the certificate repository 618 associated with the distribution service repository 614, the distribution service 612 may distribute the first certificate bundle to one or more network entities 616 associated with the virtual cloud network 602. In one example, after validating the first certificate bundle and storing the first certificate bundle in the validated certificate repository 624 and/or in the certificate repository 618 associated with the distribution service repository 614, the distribution service 612 may delete the first certificate bundle from the pending certificate repository 622. Additionally, or in the alternative, the distribution service my store the first public key in the public key repository 610, for example, for use in validating a subsequent digital signature. In one example, prior to storing the first public key in the public key repository 610, the distribution service 612 may extract the first public key from a first digital certificate of the set of one or more first digital certificates. In one example, the distribution service 612 may update the public key configuration file, and/or the file pointer in the public key configuration file, to point to the first public key in the public key repository. In one example, storing the first public key in the public key repository may include replacing the second public key with the first public key. For example, the distribution service 612 may delete the second public key from the public key repository 610 and/or the distribution service 612 may overwrite the second public key with the first public key.

In one example, the distribution service 612 may distribute the first certificate bundle to the one or more network entities 616 associated with the virtual cloud network. The first certificate bundle may include a first set of one or more first CA certificates for use by the network entities 616 in authenticating entity certificates presented by other network entities 616. In one example, after distributing the first certificate bundle to the one or more network entities 616, a first network entity 616*a* may determine that the first certificate bundle is a trusted certificate bundle. In one example, the first network entity 616*a* may determine that the first certificate bundle is a trusted certificate bundle based on a data structure of a certificate repository that identifies the first certificate bundle as a trusted certificate bundle. In one example, the first network entity 616*a* may validate a digital signature associated with the first certificate bundle in a similar manner to the validation described herein with respect to the distribution service. Additionally, or in the alternative, the first network entity 616*a* may determine that a first CA certificate, of the first set of one or more first CA certificates, is a trusted CA certificate. In one example, the first network entity 616*a* may determine that the first CA certificate is a trusted CA certificate based on the data structure of the certificate repository that identifies the first certificate bundle corresponding to the first CA certificate as a trusted certificate bundle. Additionally, or in the alternative, the first network entity 616*a* may determine that the first CA certificate is a trusted certificate by checking a certificate revocation list and determining that the first CA certificate is not identified in the certificate revocation list. The first network entity 616*a* may determine that the first CA certificate is a trusted certificate responsive to a second network entity 616*n* presenting an entity certificate issued to the first network entity 616*a* for authentication. The entity certificate may have been issued by the CA corresponding to the first CA certificate, for example, using the first private key. Additionally, or in the alternative, the entity certificate and the first CA certificate may be included in a certificate chain that is validated by the first network entity 616*a* in accordance with a security protocol.

In one example, after distributing the first certificate bundle to the one or more network entities 616, a second network entity 616*n* may determine that the second certificate bundle is an untrusted certificate bundle. In one example, the second network entity 616*n* may determine that the second certificate bundle is an untrusted certificate bundle based on a data structure of a certificate repository that identifies the second certificate bundle as an untrusted certificate bundle. In one example, the second network entity 616*n* may attempt to validate a digital signature associated with the second certificate bundle in a similar manner to the validation described herein with respect to the distribution service. The public key may mismatch the private key used to generate the digital signature, for example, as a result of the public key in the public key repository 610 having been replaced and/or a pointer to the public key in the public key repository 610 having been updated. Additionally, or in the alternative, the second network entity 616*n* may determine that a second CA certificate, of the second set of one or more second CA certificates, is an untrusted CA certificate. In one example, the second network entity 616*n* may determine that the second CA certificate is an untrusted CA certificate based on the data structure of the certificate repository that identifies the second certificate bundle corresponding to the second CA certificate as an untrusted certificate bundle. Additionally, or in the alternative, the second network entity 616*n* may determine that the second CA certificate is an untrusted CA certificate by checking a certificate revocation list and determining that the second CA certificate is identified in the certificate revocation list. The second network entity 616*n* may determine that the second CA certificate is an untrusted certificate responsive to an additional network entity 616 presenting an entity certificate issued to the second network entity 616*n* for authentication. The entity certificate may have been issued by the CA corresponding to the second CA certificate, for example, using the second private key. The first public key identified by the pointer may mismatch the second private key. Additionally, or in the alternative, the entity certificate and the first CA certificate may be included in a certificate chain that fails validation by the first network entity 616*a* in accordance with a security protocol.

In one example, the distribution service 612 may determine that the pending certificate repository 622 includes a third certificate bundle that includes a third set of one or more digital certificates. The third set of one or more digital certificates may include a third set of one or more third CA certificates. The third certificate bundle may be awaiting validation by the distribution service 612. The third set of one or more digital certificates may have been generated by the CA service using a third private key associated with a third asymmetric key pair. A third public key corresponding to the third asymmetric key pair may be included in at least one third digital certificate of the third set of one or more digital certificates. Additionally, or in the alternative, the third public key may be stored in the pending certificate repository 622 or in the public key repository 610, for example, in a data structure that associates the third public key with the third certificate bundle and/or the third set of one or more digital certificates. Additionally, the pending certificate repository 622 may include a third digital signature associated with the third certificate bundle. The third digital signature may be stored in the pending certificate repository 622 in a data structure that associates the third digital signature with the third certificate bundle.

The third digital signature may have been generated by the CA service 604 using the first private key that was used by the CA service to generate the first set of one or more digital certificates. The distribution service 612 may validate the third digital signature using the first public key of the first asymmetric key pair associated with the first set of one or more digital certificates and/or the first certificate bundle. The distribution service 612 may retrieve the first public key from the public key repository 610 and may use the first public key to validate the third digital signature. In one example, the distribution service 612 may identify a file pointer, in a public key configuration file, that points to the first public key in the public key repository, and the distribution service 612 may retrieve the first public key from the public key repository based on the file pointer. The public key configuration file may be stored in the CA service repository 606, or in the public key repository 610. The distribution service 612 may determine, using the second public key, that the third digital signature was generated using the first private key of the first asymmetric key pair. Responsive to determining that the third digital signature was generated using the first private key, the distribution service 612 may store the third certificate bundle in the validated certificate repository 624 as a trusted certificate bundle. The certificate repository may include a data structure that identifies the third certificate bundle as a trusted certificate bundle. Additionally, or in the alternative, the distribution service 612 may store the third certificate bundle in the certificate repository 618 associated with the distribution service repository 614 as a trusted certificate bundle. The certificate repository 618 may include a data structure that identifies the third certificate bundle as the trusted certificate bundle.

In one example, the distribution service 612 may store the third certificate bundle in the certificate repository 618 in a data structure that identifies the third certificate bundle as a current certificate bundle. Identifying the third certificate bundle as a current certificate bundle may include identifying the third certificate bundle as a trusted certificate bundle. The identification of the third certificate bundle as the current certificate bundle may indicate that the third certificate bundle is currently available for distribution to one or more network entities 616 associated with the virtual cloud network 602. Additionally, or in the alternative, the identification of the third certificate bundle as the current certificate bundle may indicate that the third certificate bundle is the latest version of one or more certificate bundles that are available for distribution to the one or more network entities 616. In one example, prior to storing the third certificate bundle in the certificate repository 618, the certificate repository 618 may include the first certificate bundle that includes the first set of one or more digital certificates. The certificate repository 618 may include a data structure that identifies the first certificate bundle as a current certificate bundle. In one example, the distribution service 612 may update the data structure to identify the first certificate bundle as a previous certificate bundle. The identification of the first certificate bundle as the previous certificate bundle may indicate that the first certificate bundle is an earlier version with respect to one or more certificate bundles that are available for distribution to the one or more network entities 616, such as with respect to the third certificate bundle and/or another current certificate bundle. Additionally, or in the alternative, the identification of the first certificate bundle as the previous certificate bundle may indicate that the first certificate bundle is scheduled to be removed from distribution, and/or that the first certificate bundle is no longer available for distribution, to one or more network entities 616 associated with the virtual cloud network 602. Additionally, or in the alternative, identifying the first certificate bundle as the previous certificate bundle may include identifying the first certificate bundle as an untrusted certificate bundle.

After storing the third certificate bundle in the validated certificate repository 624 and/or in the certificate repository 618 associated with the distribution service repository 614, the distribution service 612 may distribute the third certificate bundle to one or more network entities 616 associated with the virtual cloud network 602. In one example, after validating the third certificate bundle and storing the third certificate bundle in the validated certificate repository 624 and/or in the certificate repository 618 associated with the distribution service repository 614, the distribution service 612 may delete the third certificate bundle from the pending certificate repository 622. Additionally, or in the alternative, the distribution service my store the third public key in the public key repository 610, for example, for use in validating a subsequent digital signature. In one example, prior to storing the third public key in the public key repository 610, the distribution service 612 may extract the third public key from a third digital certificate of the set of one or more third digital certificates. In one example, the distribution service 612 may update the public key configuration file, and/or the file pointer in the public key configuration file, to point to the third public key in the public key repository. In one example, storing the third public key in the public key repository may include replacing the first public key with the third public key. For example, the distribution service 612 may delete the first public key from the public key repository 610 and/or the distribution service 612 may overwrite the first public key with the third public key.

Referring now to FIG. 6B, the system 600 is further described with reference to an example virtual cloud network 650. The virtual cloud network 650 may include or correspond to the virtual cloud network 602 described with reference to FIG. 6A. As shown in FIG. 6B, the virtual cloud network 650 may include a substrate network 652, an overlay network 654, and a network interface 656 that provides communication between the substrate network 652 and the overlay network 654. The system 600 may include a plurality of network entities 658 located throughout the virtual cloud network 650. The plurality of network entities 658 may correspond to the plurality of network entities 616 described with reference to FIG. 6A. A network entity 658 may reside on the substrate network 652, the overlay network 654, or the network interface 656. A network entity 658 may be implemented in hardware and/or software in association with the virtual cloud network, such as a node, a host, an agent, a service, a component, an endpoint, or other element. The plurality of network entities 658 may include one or more substrate entities 660, one or more interface entities 662, and/or one or more overlay entities 664.

As used herein, the term "substrate entity" refers to a network entity 658 implemented in a substrate network 652. As used herein, the term "substrate network" refers to a physical network infrastructure. The substrate network generally provides a foundation of a virtual cloud network. The substrate network 652 may include physical network devices, such as routers, switches, network links, and other networking components. The substrate network 652 may generally provide the basic connectivity and transport capabilities necessary for data transmission within and between data centers.

The one or more substrate entities 660 may include substrate hosts, routers, firewall appliances, load balancers, storage devices, and/or substrate services. A substrate host may include an endpoint within the substrate network 652, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity 660 may include a combination of hardware and software. In one example, the one or more substrate entities 660 may include one or more substrate hosts, and/or one or more substrate services. In one example, a substrate host may include a bare metal host. In one example, a substrate service may include a firmware service. The substrate entities 660 may communicate with one another, and/or with other network entities 658, using logical network addresses assigned within the overlay network.

As used herein, the term "network interface" refers to a communication interface between a substrate network and an overlay network, such as a network interface card, a smartNIC, or the like. A network interface 656 may include one or more interface entities 662, such as a node on the network interface 656, or an interface service executing or executable on the network interface 656. A node on the network interface 656 may include a programmable hardware component, a memory component, or a gateway component. In one example, a network interface 656 may include a network interface card, such as a smartNIC. Additionally, or in the alternative, a network interface 656 may include a node or an endpoint on a network interface card or smartNIC.

A gateway component may provide connectivity between the substrate network 652 and the network interface 656, and/or between the network interface 656 and the overlay network 654. For example, a gateway component may enable communication between overlay entities 664 and substrate entities 660. Additionally, or in the alternative, a gateway component may provide connectivity between the overlay network 654 and external networks, such as the internet or other networks outside the overlay network. For example, an overlay gateway may enable communication between overlay entities 664 and external endpoints.

As used herein, the term “overlay network” refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term “overlay entity” refers to a network entity 658 implemented on an overlay network 654. The overlay network 654 may include a plurality of overlay entities 664. The plurality of overlay entities 664 may include overlay hosts, overlay services, subnets, overlay controllers, and/or overlay clients. In one example, the overlay network 654 may include a plurality of overlay entities 664, such as overlay entity 664*c* and overlay entity 664*n*. In one example, an overlay entity 664 may include an overlay host. Additionally, or in the alternative, an overlay entity 664 may include an overlay service. The plurality of overlay entities 664 may communicate with one another using logical network addresses assigned within the overlay network 654.

An overlay host may include an endpoint within the overlay network 654, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

Referring further to FIG. 6B, the system 600 may include at least one distribution service 666 and at least one certificate repository 668. The at least one distribution service 666 may correspond to the distribution service 612 described with reference to FIG. 6A. A distribution service 666 may be configured to validate certificate bundles, for example, as described with reference to FIG. 6A. Additionally, or in the alternative, a distribution service 666 may be configured to distribute certificate bundles to at least some of the network entities 658. The certificate bundles may be housed in a certificate repository 668 accessible by the distribution service 612. The certificate repository 668 may correspond to the certificate repository 618 associated with the distribution service repository 614, as described with reference to FIG. 6A. The distribution service 666 may retrieve a certificate bundle from the certificate repository 668 and transmit the certificate bundle to one or more of the network entities 658. In one example, a distribution service 666 may be configured to transition, such as concurrently transition, a plurality of network entities through a series of phases of a certificate bundle distribution process for distributing a new set of one or more CA certificates to the plurality of network entities 658 for use in a certificate authentication process, for example, as further described below in Section 6, “Example Certificate Bundle Distribution Process.”

In one example, a first distribution service 666*a* may be implemented on the substrate network 652. A distribution service 666 implemented on the substrate network 652 may be communicatively coupled with one or more substrate entities 660 on the substrate network 652. Additionally, or in the alternative, a distribution service 666 implemented on the substrate network 652 may be communicatively coupled with the network interface 656, such as with one or more interface entities 662 on the network interface 656. For example, the first distribution service 666*a* may obtain certificate bundles from the certificate repository 668 and distribute the certificate bundles to one or more substrate entities 660 on the substrate network 652 and/or to one or more interface entities 662 on the network interface 656.

In one example, a second distribution service 666*b* may be implemented on the network interface 656. A distribution service 666 implemented on the network interface 656 may be communicatively coupled with the overlay network 654 and/or the substrate network 652. For example, the second distribution service 666*b* implemented on the network interface 656 may be communicatively coupled with one or more overlay entities 664 on the overlay network 654. The second distribution service 666*b* may distribute certificate bundles to one or more overlay entities 664 on the overlay network 654. In one example, the second distribution service 666*b* may obtain certificate bundles from a storage medium associated with the network interface 656, such as from a storage medium associated with an interface entity 662 on the network interface 656. For example, the second distribution service 666*b* may distribute a certificate bundle that has been installed in the storage medium associated with the network interface 656 and/or the interface entity 662. In one example, the first distribution service 666*a* may distribute a certificate bundle to an interface entity 662 on the network interface 656, and the second distribution service 666*b* may distribute the certificate bundle to one or more overlay entities 664 on the overlay network 654 after the certificate bundle has been installed in the storage medium associated with the interface entity 662.

As shown in FIG. 6B, each network entity 658 may include a provisioning module 670 and a storage medium 672. The provisioning module 670 associated with a network entity 658 may receive certificate bundles from the distribution service 666 and install the certificate bundle in the storage medium 672 associated with the network entity 658. The distribution service 666 may distribute a certificate bundle to the provisioning module 670 in connection with an initial provisioning of the network entity 658 and/or in connection with a periodic update. Additionally, or in the alternative, the distribution service 666 may distribute a certificate bundle to the provisioning module 670 in accordance with a respective phase of a certificate bundle distribution process.

In one example, a provisioning module 670 of an overlay entity 664 may send requests for a certificate bundle to a distribution service 666 by way of a gateway 674 between the network interface 656 and the overlay entities 664. Additionally, or in the alternative, the distribution service 666 may send the certificate bundles to the overlay entities 664 by way of the gateway 674, for example, in response to a request from a provisioning module 670. In one example, the gateway 674 may be a metadata interface configured for exchanging metadata between the network interface 656 and the overlay entities 664 In one example, the gateway 674 may be utilized between the network interface 656 and each of the overlay entities 664. Additionally, or in the alternative, the network interface 656 may include a set of gateways 674, with each gateway 674 corresponding to a respective overlay entity 664.

The virtual cloud network may include one or more data repositories. The one or more data repositories may include the CA service repository 606 and/or the distribution service repository 614 respectively described with reference to FIG. 6A. The one or more data repositories may further include the certificate repository 608 and/or the public key repository 610 respectively described in association with the CA service repository 606. Additionally, or in the alternative, the one or more data repositories may further include the certificate repository 618 and/or the public key repository 620 respectively described in association with the distribution service repository 614. Additionally, or in the alternative, the one or more data repositories may include the certificate repository 668 and/or the various storage medium 672 described with reference to FIG. 6B. Each of the one or more data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The one or more data repositories may share one or more storage units with one another. Additionally, or in the alternative, the or more data repositories may include one or more storage units that differ from one another. Further, the or more data repositories may be implemented or executed on the same computing system as the CA service 604, the distribution service 612, and/or one or more of the network entities 616. Additionally, or in the alternative, one or more of the data repositories may be implemented or executed on a computing system separate from one or more of the CA service 604, the distribution service 612, and/or one or more of the network entities 616. The one or more data repositories may be communicatively coupled to the CA service 604, the distribution service 612, and/or one or more of the network entities 616 via a direct connection or via a network.

In one or more embodiments, the system 600 may include more or fewer components than the components illustrated in FIGS. 6A and 6B. The components illustrated in FIGS. 6A and 6B may be local to or remote from each other. The components illustrated in FIGS. 6A and 6B may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. AUTHENTICATING NETWORK ENTITIES

Network entities may utilize the CA certificates in a certificate bundle to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

A distribution service may distribute certificate bundles to network entities In one example, the distribution service may determine whether a certificate bundle is a trusted certificate bundle prior to distributing the certificate bundle to the network entities. A distribution service may reject a certificate bundle that the distribution service determines is an untrusted certificate bundle. Additionally, or in the alternative, the network entities may determine whether a certificate bundle is a trusted certificate bundle prior to utilizing the CA certificates in the certificate bundle to authenticate other network entities. A network entity may reject a certificate bundle that the network entity determines is an untrusted certificate bundle.

As used herein, the term "certificate bundle" refers to a file that contains one or more digital certificates. In one example, the one or more digital certificates in a certificate bundle may include CA certificates, such as root CA certificates or intermediate CA certificates. In another example, the one or more digital certificates in a certificate bundle may include one or more entity certificates.

As used herein, the term "trusted certificate bundle" refers to a certificate bundle that has been validated based on a digital signature associated with the certificate bundle. The digital signature may be validated by a distribution service as described herein. A network entity that receives a certificate bundle from a distribution service may rely on a validation performed by the distribution service. In one example, a network entity may regard a certificate bundle received from the distribution service as a trusted certificate bundle, for example, based on a system architecture in which the distribution service validates a certificate bundle prior to distributing the certificate bundle to network entities. Network entities that receive a certificate bundle from the distribution service may inherently trust the certificate bundle, such that a certificate bundle received by a network entity from the distribution service may be regarded as a trusted certificate bundle. Additionally, or in the alternative, network entities may regard a certificate bundle received from the distribution service as a trusted certificate bundle based on a system architecture in which the distribution service stores certificate bundles that have been validated in a data structure that identifies the certificate bundle as a trusted certificate bundle. In one example, a certificate bundle may be identified as a trusted certificate bundle, for example, by a network entity, based on a file pointer, in a certificate bundle configuration file, that points to a file location where a certificate bundle that has been validated, and thus is a trusted certificate bundle, is stored. The certificate bundle configuration file may be stored in the CA service repository 606, or in the certificate repository 608. A network entity may verify that a certificate bundle received from the distribution service corresponds to a location identified by the file pointer. Additionally, or in the alternative, a network entity may determine that a certificate bundle is a trusted certificate bundle by validating the digital signature associated with the certificate bundle, for example, in addition or in the alternative to a validation performed by the distribution service.

As used herein, the term "untrusted certificate bundle" refers to a certificate bundle that (a) has yet to be validated based on a digital signature associated with the certificate bundle, (b) is unvalidatable based on the digital signature, or (d) is associated with a digital signature that was previously validated or validatable, and is no longer valid or validatable, or (e) has been identified by a distribution service as an untrusted certificate bundle. An untrusted certificate bundle may include a certificate bundle that fails one or more criteria for validating the certificate bundle and/or for determining that the certificate bundle is a trusted certificate bundle. An untrusted certificate bundle may include a certificate bundle that was previously trusted by a network entity but is no longer trusted by the network entity. An untrusted certificate bundle may include a certificate bundle that is no longer used by the network entity to authenticate other network entities.

In one example, a network entity may regard a certificate bundle as an untrusted certificate bundle if the certificate bundle is not provided to the network entity from the distribution service, for example, based on a system architecture in which the distribution service validates a certificate bundle prior to distributing the certificate bundle to network entities. Network entities that receive a certificate bundle from a source other than the distribution service may inherently distrust the certificate bundle, such that a certificate bundle received by a network entity from a source other than the distribution service may be regarded as an untrusted certificate bundle. Additionally, or in the alternative, network entities may regard a certificate bundle as an untrusted certificate bundle based on a message or instruction received from the distribution service. In one example, a distribution service may transmit a message to a network entity that a certificate bundle that was previously a trusted certificate bundle is being replaced and is no longer a trusted certificate bundle. The network entity may regard the previously trusted certificate bundle as an untrusted certificate bundle, for example, based on the message or instruction from the distribution service. In one example, the network entity may delete an untrusted certificate bundle. Additionally, or in the alternative, a network entity may receive a new certificate bundle that is a trusted certificate bundle, and the trusted certificate bundle may replace or overwrite the untrusted certificate bundle (e.g., the certificate bundle that was previously trusted). In one example, a certificate bundle may be identified as an untrusted certificate bundle, for example, by a network entity, based on a file pointer in a certificate bundle configuration file that points to a file location where a certificate bundle that is an untrusted certificate bundle is stored. The certificate bundle configuration file may be stored in the CA service repository 606, or in the certificate repository 608. A network entity may determine that a certificate bundle corresponds to a location for untrusted certificate bundles identified by the file pointer, and based on the location identified by the file pointer, the network entity may determine that the certificate bundle is an untrusted certificate bundle. Additionally, or in the alternative, a network entity may determine that a certificate bundle is an untrusted certificate bundle by performing a validation operation on a digital signature associated with the certificate bundle, and determining that the digital signature fails the validation operation.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

A trusted certificate bundle may include one or more trusted CA certificates. An untrusted certificate bundle may include one or more untrusted CA certificates. As used herein, the term "trusted CA certificate" refers to a CA certificate that is included in a trusted certificate bundle. As used herein, the term "untrusted CA certificate" refers to a CA certificate that is included in an untrusted certificate bundle.

In one example, a network entity may determine that a CA certificate is a trusted CA certificate, for example, prior to using the CA certificate to authenticate another network entity. A trusted CA certificate may be validated, for example, as part of a certificate chain, based on the signature-key pair corresponding to the trusted CA certificate. A network entity may trust another network entity when the network entity successfully authenticates the other network entity based on a certificate chain that includes an entity certificate presented by the other network entity and one or more CA certificates, in which each of the one or more CA certificates is a trusted CA certificate. In one example, a network entity may trust another entity that presents an entity certificate that was issued by a CA based on a trusted CA certificate, such as a root CA certificate that is a trusted CA certificate.

In one example, a network entity may reject a CA certificate that is an untrusted CA certificate. For example, a network entity may determine whether a CA certificate is a trusted CA certificate or an untrusted CA certificate, for example, prior to using the CA certificate to authenticate another network entity. Responsive to determining that a CA certificate is an untrusted CA certificate, the network entity may terminate, or refrain from initiating, an authentication process for the other network entity based on the untrusted CA certificate. In one example, a network entity may distrust another network entity, or may determine that the other network entity is unauthenticated, based on a certificate chain that includes the entity certificate presented by the other network entity for authentication and one or more untrusted CA certificates. For example, a network entity may distrust another network entity, or may determine that the other network entity is unauthenticated, when the other network entity presents an entity certificate for authentication that was issued by a CA based on an untrusted CA certificate, such as a root CA certificate that is an untrusted CA certificate.

As used herein, the term "certificate authority certificate" or "CA certificate" refers to a digital certificate issued by a CA to establish its own identity and authenticity. A CA certificate issued by a CA may include a public key corresponding to a private key held by the CA. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity or certificate holder. The entity or certificate holder may hold a private key corresponding to the public key. The public key may be included in or associated with the digital certificate. The digital certificate may be validated by matching the public key to the private key through the use of cryptography. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

6. EXAMPLE CERTIFICATE BUNDLE DISTRIBUTION PROCESS

Figure 7:
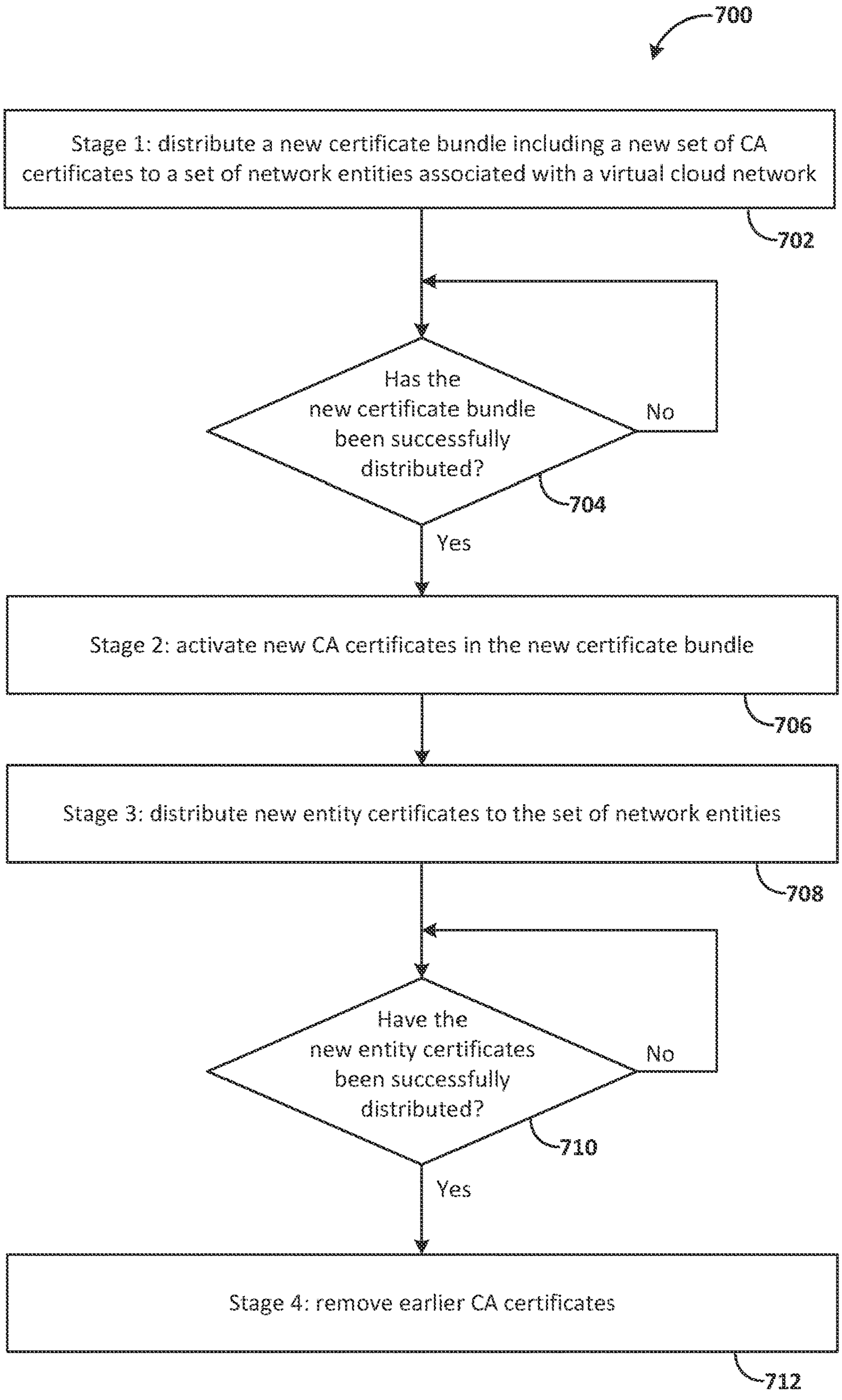
FIG. 7 is a flowchart that illustrates an example certificate bundle distribution process for distributing a set of CA certificates to network entities associated with a virtual cloud network in accordance with one or more embodiments.

Referring now to FIG. 7, operations pertaining to an example certificate bundle distribution process are further described. The operations 700 described with reference to FIG. 7 may be associated with distributing a new set of one or more CA certificates to a plurality of network entities for use in a certificate authentication process. The CA certificates may include root CA certificates and/or intermediate CA certificates. The CA certificates may be housed in a certificate bundle. One or more operations 700 illustrated in FIG. 7 may be modified, rearranged, or omitted all together. Accordingly, the particular sequence of operations 700 illustrated in FIG. 7 should not be construed as limiting the scope of one or more embodiments. As shown in FIG. 7, operations 700 pertaining to the certificate bundle distribution process may include a series or sequence of phases. In one example, as shown, the operations 700 may include a series or sequence of phases, such as four (4) phases. In another example, the series or sequence of phases may include more or less than four (4) phases, for example, including all or a portion of the phases shown in FIG. 7.

In one example, the operations 700 may include, at block 702, distributing a new certificate bundle including a new set of one or more CA certificates to a set of network entities associated with a virtual cloud network. The new set of one or more CA certificates may include: at least one new CA certificate. Additionally, or in the alternative, a set of new CA certificates may be added to existing certificate bundles. At block 704, the operations 700 may include determining whether the new certificate bundle has been successfully distributed. When the new certificate bundle has been successfully distributed, the operations 700 may proceed to a next phase in the distribution process. The operation at block 702 and/or 704 may represent Phase 1 of a certificate bundle distribution process.

In one example, the operations 700 may include, at block 706, activating the CA certificates in the new certificate bundle. In one example, activating the CA certificate may include a CA corresponding to the CA certificate issuing one or more intermediate CA certificates. The operation at block 706 may represent Phase 2 of a certificate bundle distribution process. In one example, the operations 700 may include, at block 708, distributing new entity certificates to the set of network entities. Additionally, or in the alternative, the operations 700 may include distributing new intermediate CA certificates, for example, corresponding to the new entity certificates.

At block 710, the operations 700 may include determining whether the new entity certificates have been successfully distributed. Additionally, or in the alternative, the operations may include determining whether the new intermediate CA certificates have been successfully distributed. When the new entity certificates (and/or the new intermediate CA certificates) have been successfully distributed, the operations 700 may proceed to a next phase in the distribution process. The operation at block 708 and 710 may represent Phase 3 of a certificate bundle distribution process.

In one example, the operations 700 may include, at block 712, removing earlier CA certificates that were distributed prior to the new CA certificates. For example, the earlier CA certificates may include CA certificates that are being superseded by the new CA certificates. Removing an earlier CA certificate with respect to a particular network entity may include deleting the earlier CA certificate from a storage medium associated with the particular network entity. For example, the operations 700 may include transmitting, to the particular network entity, an instruction to delete the earlier CA certificate from the storage medium. Rpensive to receiving the instruction, the particular network entity may delete the earlier CA certificate from the storage medium.

Additionally, or in the alternative, removing an earlier CA certificate with respect to a network entity may include replacing a first new certificate bundle with a second new certificate bundle, in which the first new certificate bundle includes the new CA certificates and the earlier CA certificates and the second new certificate bundle includes only the new CA certificates, thereby effectively removing the earlier CA certificates from the first new certificate bundle. The second new certificate bundle may be distributed to the particular network entity and installed in the storage medium associated with the particular network entity, and the first new certificate bundle may be deleted from the storage medium. The operation at block 712 may represent Phase 4 of a certificate bundle distribution process.

7. VALIDATING CERTIFICATE BUNDLES

Figure 8:
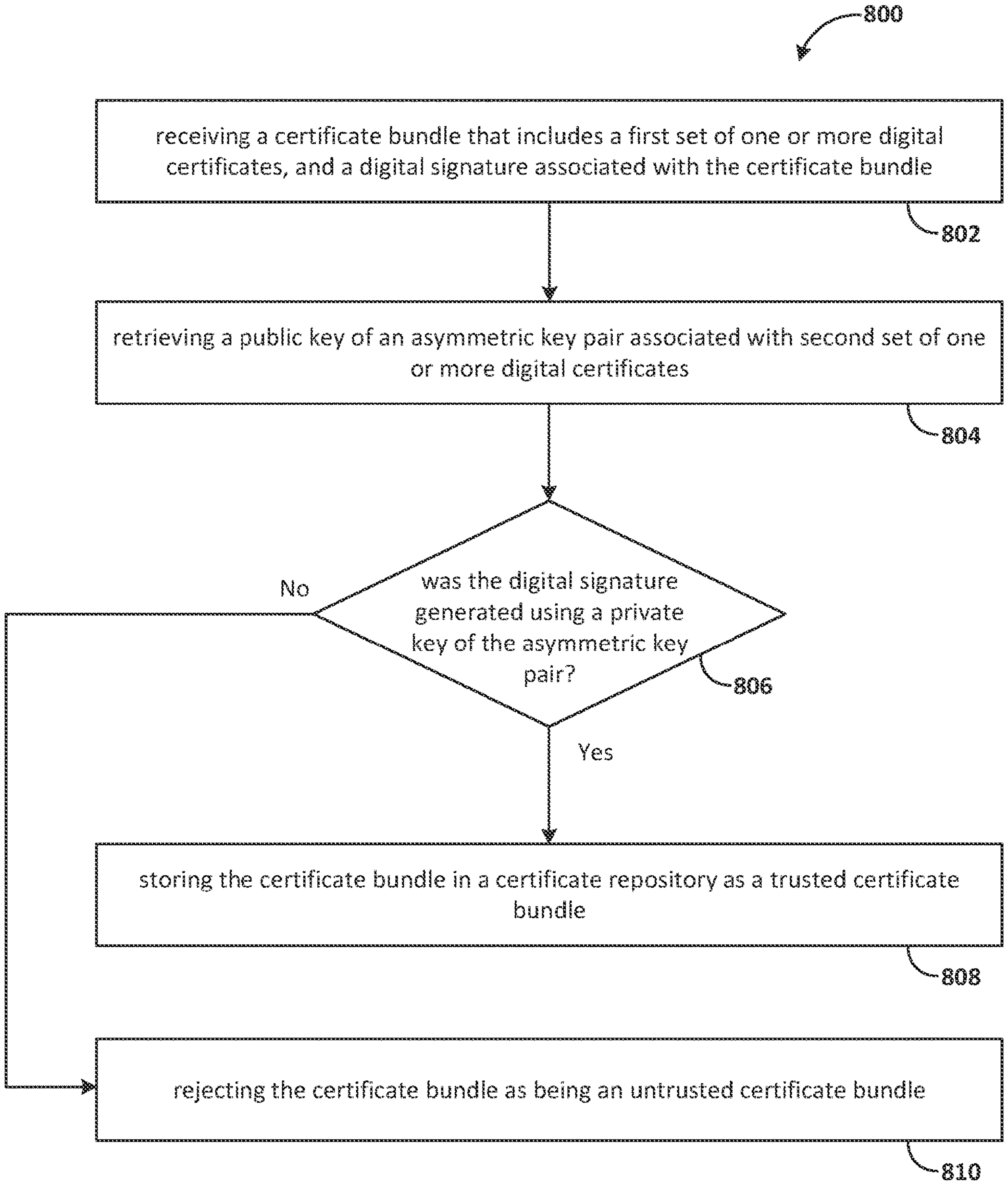
FIG. 8 is a flowchart that illustrates example operations pertaining to validating a certificate bundle in accordance with one or more embodiments.

Referring now to FIG. 8, operations 800 pertaining to validating certificate bundles are further described. The operations 800 described with reference to FIG. 8 may represent at least a portion of a process for distributing certificate bundles to network entities and/or provisioning cloud resource instances, as respectively described herein. One or more operations 800 described with reference to in FIG. 8 may be modified, combined, rearranged, or omitted all together. Accordingly, the particular sequence of operations 800 described with reference to FIG. 8 should not be construed as limiting the scope of one or more embodiments.

As shown in FIG. 8, the operations 800 may include, at block 802, receiving a certificate bundle that includes a first set of one or more digital certificates, and a digital signature associated with the certificate bundle. At block 804, the operations 800 may include retrieving a public key of an asymmetric key pair associated with second set of one or more digital certificates. At block 806, the operations 800 may include determining whether the digital signature was generated using a private key of the asymmetric key pair.

Responsive to determining that the digital signature was generated using the private key of the asymmetric key pair, the operations 800 may proceed to 808. At block 808, the operations 800 may include storing the certificate bundle in a certificate repository as a trusted certificate bundle. The certificate repository may include a data structure that identifies the certificate bundle as the trusted certificate bundle. Additionally, or in the alternative, responsive to determining that the digital signature was not generated using the private key of the asymmetric key pair, the operations 800 may proceed to 810. At block 810, the operations 800 may include rejecting the certificate bundle as being an untrusted certificate bundle.

8. MISCELLANEOUS; EXTENSIONS

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions, which when executed by one or more hardware processors, cause performance of operations comprising:

receiving a first certificate bundle and a digital signature associated with the first certificate bundle,
- wherein the first certificate bundle comprises a first set of one or more digital certificates;

determining, using a public key of an asymmetric key pair associated with a second certificate bundle comprising a second set of one or more digital certificates, that the digital signature is generated using a private key of the asymmetric key pair;

responsive to determining that the digital signature is generated using the private key:
- storing the first certificate bundle in a certificate repository as a trusted certificate bundle, and
- updating a data structure associated with the certificate repository to identify the first certificate bundle as a current certificate bundle and the second certificate bundle as a first untrusted certificate bundle;

based on the first certificate bundle being identified in the data structure as the current certificate bundle, distributing the first certificate bundle to one or more network entities associated with a virtual cloud network.

2. The media of claim 1, wherein the operations further comprise:

receiving a first public key of a first asymmetric key pair associated with a first digital certificate of the first set of one or more digital certificates, wherein the public key associated with the second set of one or more digital certificates is a second public key, and wherein the private key used to generate the digital signature is a second private key; and responsive to determining that the digital signature is generated using the second private key, storing the first public key in a public key repository, wherein the public key repository comprises a first data structure that identifies the first public key as being associated with the first digital certificate of the first set of one or more digital certificates, wherein prior to storing the first public key in the public key repository, the second public key is stored in the public key repository, wherein the public key repository comprises a second data structure that identifies the second public key as being associated with the second set of one or more digital certificates.

3. The media of claim 2, wherein storing the first public key in the public key repository comprises replacing the second public key with the first public key.

4. The media of claim 2, wherein the first public key is included in the first digital certificate, and wherein the operations further comprise:

prior to storing the first public key in the public key repository, extracting the first public key from the first digital certificate.

5. The media of claim 2, wherein the operations further comprise:

prior to determining that the digital signature is generated using the second private key, identifying a file pointer in a public key configuration file, wherein the file pointer points to the second public key in the public key repository, and retrieving, based on the file pointer, the second public key from the public key repository; and subsequent to determining that the digital signature is generated using the second private key, storing the first public key in the public key repository and updating the public key configuration file and/or the file pointer in the public key configuration file, to point to the first public key in the public key repository.

6. The media of claim 2, wherein the operations further comprise:

receiving a third certificate bundle and a third digital signature associated with the third certificate bundle, wherein the third certificate bundle comprises (i) a third set of one or more digital certificates and (ii) a third public key of a third asymmetric key pair associated with a third digital certificate of the third set of one or more digital certificates, and wherein the third digital signature is generated using a first private key of the first asymmetric key pair associated with the first set of one or more digital certificates;

identifying a file pointer in a public key configuration file, wherein the file pointer points to the first public key in the public key repository;

retrieving, based on the file pointer, the first public key from the public key repository;

determining, using the first public key, that the third digital signature is generated using the first private key;

responsive to determining that the third digital signature is generated using the first private key:

storing the third certificate bundle in the certificate repository as the trusted certificate bundle;

storing the third public key in the public key repository, wherein the public key repository comprises a third data structure that identifies the third public key as being associated with the third digital certificate of the third set of one or more digital certificates, wherein storing the third public key in the public key repository comprises replacing the first public key with the third public key; and updating the public key configuration file and/or the file pointer in the public key configuration file, to point to the third public key in the public key repository;

wherein the certificate repository comprises a fourth data structure, wherein prior to storing the third certificate bundle in the certificate repository, the fourth data structure identifies the first certificate bundle as the trusted certificate bundle, and wherein storing the third certificate bundle in the certificate repository as the trusted certificate bundle comprises:

updating the fourth data structure to identity the first certificate bundle as a second untrusted certificate bundle and to identify the third certificate bundle as the trusted certificate bundle.

7. The media of claim 1, wherein the private key is held by a certificate authority (CA), and wherein the trusted certificate bundle comprises one or more CA certificates issued by the CA.

8. The media of claim 1, wherein the trusted certificate bundle comprises one or more certificate authority (CA) certificates, and wherein a first network entity trusts a second network entity based on an authentication operation performed by the first network entity, wherein the authentication operation comprises validating a certificate chain that includes (a) an entity certificate presented by the second network entity and (b) at least one CA certificate of the one or more CA certificates.

9. The media of claim 1, wherein the operations further comprise:

prior to receiving the first certificate bundle and the digital signature associated with the first certificate bundle:

polling a pending certificate repository for a pending certificate bundle; and downloading the first certificate bundle and the digital signature associated with the first certificate bundle responsive to polling the pending certificate repository for the pending certificate bundle, wherein the first certificate bundle is the pending certificate bundle.

10. The media of claim 1, wherein the operations further comprise:

prior to receiving the first certificate bundle and the digital signature associated with the first certificate bundle:

receiving a notification that a pending certificate bundle is available in a pending certificate repository; and responsive to receiving the notification, downloading the first certificate bundle and the digital signature associated with the first certificate bundle from the pending certificate repository, wherein the first certificate bundle is the pending certificate bundle.

11. The media of claim 1, wherein the operations further comprise:

updating the data structure to identity the second certificate bundle as a previous certificate bundle.

12. The media of claim 1, wherein the first set of one or more digital certificates comprises a first set of one or more first CA certificates, and wherein the second set of one or more digital certificates comprise a second set of one or more second CA certificates.

13. The media of claim 12, wherein subsequent to distributing the current certificate bundle to the one or more network entities associated with the virtual cloud network, (a) a first network entity of the one or more network entities determines that a first CA certificate, of the first set of one or more first CA certificates, is a trusted CA certificate, or (b) a second network entity of the one or more network entities determines that a second CA certificate, of the second set of one or more second CA certificates, is an untrusted CA certificate.

14. The media of claim 1, wherein the digital signature is generated by (a) applying a hash function to the first certificate bundle to obtain a first hash value and (b) digitally signing the first hash value using the private key of the asymmetric key pair associated with the second set of one or more digital certificates.

15. The media of claim 14, wherein determining that the digital signature is generated using the private key comprises:

generating a second hash value by applying the hash function to the first certificate bundle;

generating a third hash value by decrypting the digital signature using the public key; and determining that the third hash value matches the second hash value.

16. The media of claim 1, wherein prior to receiving the first certificate bundle, the second set of one or more digital certificates are currently or previously trusted.

17. A method, comprising:

receiving a first certificate bundle and a digital signature associated with the first certificate bundle, wherein the first certificate bundle comprises a first set of one or more digital certificates, and wherein the digital signature is generated using a private key of an asymmetric key pair associated with a second certificate bundle comprising a second set of one or more digital certificates;

determining, using a public key of the asymmetric key pair associated with the second certificate bundle comprising the second set of one or more digital certificates, that the digital signature is generated using the private key;

responsive to determining that the digital signature is generated using the private key:

storing the first certificate bundle in a certificate repository as a trusted certificate bundle, and updating a data structure associated with the certificate repository to identify the first certificate bundle as a current certificate bundle and the second certificate bundle as an untrusted certificate bundle;

based on the first certificate bundle being identified in the data structure as the current certificate bundle, distributing the first certificate bundle to one or more network entities associated with a virtual cloud network;

wherein the method is performed by at least one device including a hardware processor.

18. The method of claim 17, further comprising:

receiving a first public key of a first asymmetric key pair associated with a first digital certificate of the first set of one or more digital certificates, wherein the public key associated with the second set of one or more digital certificates is a second public key, and wherein the private key used to generate the digital signature is a second private key; and responsive to determining that the digital signature is generated using the second private key, storing the first public key in a public key repository, wherein the public key repository comprises a first data structure that identifies the first public key as being associated with the first digital certificate of the first set of one or more digital certificates, wherein prior to storing the first public key in the public key repository, the second public key is stored in the public key repository, wherein the public key repository comprises a second data structure that identifies the second public key as being associated with the second set of one or more digital certificates.

19. The method of claim 18, wherein storing the first public key in the public key repository comprises replacing the second public key with the first public key.

20. The method of claim 18, wherein the first public key is included in the first digital certificate, and wherein the method further comprises:

prior to storing the first public key in the public key repository, extracting the first public key from the first digital certificate.

21. The method of claim 18, further comprising:

prior to determining that the digital signature is generated using the second private key, identifying a file pointer, wherein the file pointer points to the second public key in the public key repository, and retrieving, based on the file pointer, the second public key from the public key repository; and subsequent to determining that the digital signature is generated using the second private key, storing the first public key in the public key repository and updating the file pointer to point to the first public key in the public key repository.

22. The method of claim 18, further comprising:

receiving a third certificate bundle and a third digital signature associated with the third certificate bundle, wherein the third certificate bundle comprises (i) a third set of one or more digital certificates and (ii) a third public key of a third asymmetric key pair associated with a third digital certificate of the third set of one or more digital certificates, and wherein the third digital signature is generated using a first private key of the first asymmetric key pair associated with the first set of one or more digital certificates;

identifying a file pointer, wherein the file pointer points to the first public key in the public key repository;

retrieving, based on the file pointer, the first public key from the public key repository;

determining, using the first public key, that the third digital signature is generated using the first private key;

responsive to determining that the third digital signature is generated using the first private key:

storing the third certificate bundle in the certificate repository, wherein the certificate repository comprises a third data structure that identifies the third certificate bundle as an additional trusted certificate bundle;

storing the third public key in the public key repository, wherein the public key repository comprises a fourth data structure that identifies the third public key as being associated with the third digital certificate of the third set of one or more digital certificates, wherein storing the third public key in the public key repository comprises replacing the first public key with the third public key; and updating the file pointer to point to the third public key in the public key repository.

23. The method of claim 17, wherein the private key is held by a certificate authority (CA), and wherein the trusted certificate bundle comprises one or more CA certificates issued by the CA.

24. The method of claim 17, wherein the trusted certificate bundle comprises one or more certificate authority (CA) certificates, and wherein a first network entity trusts a second network entity based on an authentication operation performed by the first network entity, wherein the authentication operation comprises validating a certificate chain that includes (a) an entity certificate presented by the second network entity and (b) at least one CA certificate of the one or more CA certificates.

25. The method of claim 17, further comprising:

prior to receiving the first certificate bundle and the digital signature associated with the first certificate bundle:

polling a pending certificate repository for a pending certificate bundle; and downloading the first certificate bundle and the digital signature associated with the first certificate bundle responsive to polling the pending certificate repository for the pending certificate bundle, wherein the first certificate bundle is the pending certificate bundle.

26. The method of claim 17, further comprising:

prior to receiving the first certificate bundle and the digital signature associated with the first certificate bundle:

receiving a notification that a pending certificate bundle is available from a pending certificate repository; and responsive to receiving the notification, downloading the first certificate bundle and the digital signature associated with the first certificate bundle from the pending certificate repository, wherein the first certificate bundle is the pending certificate bundle.

27. The method of claim 17, wherein the method further comprises:

updating the data structure to identity the second certificate bundle as a previous certificate bundle.

28. The method of claim 17, wherein the first set of one or more digital certificates comprises a first set of one or more first CA certificates, and wherein the second set of one or more digital certificates comprise a second set of one or more second CA certificates.

29. The method of claim 28, wherein subsequent to distributing the current certificate bundle to the one or more network entities associated with the virtual cloud network, (a) a first network entity of the one or more network entities determines that a first CA certificate, of the first set of one or more first CA certificates, is a trusted CA certificate, or (b) a second network entity of the one or more network entities determines that a second CA certificate, of the second set of one or more second CA certificates, is an untrusted CA certificate.

30. The method of claim 17, wherein prior to receiving the first certificate bundle, the second set of one or more digital certificates are currently or previously trusted.

31. A system comprising:

at least one hardware processor;

the system being configured to execute operations, using the at least one hardware processor, the operations comprising:

receiving a first certificate bundle and a digital signature associated with the first certificate bundle, wherein the first certificate bundle comprises a first set of one or more digital certificates, and wherein the digital signature is generated using a private key of an asymmetric key pair associated with a second certificate bundle comprising a second set of one or more digital certificates;

determining, using a public key of the asymmetric key pair associated with the second certificate bundle comprising the second set of one or more digital certificates, that the digital signature is generated using the private key;

responsive to determining that the digital signature is generated using the private key:

storing the first certificate bundle in a certificate repository as a trusted certificate bundle, and updating a data structure associated with the certificate repository to identify the first certificate bundle as a current certificate bundle and the second certificate bundle as an untrusted certificate bundle;

based on the first certificate bundle being identified in the data structure as the current certificate bundle, distributing the first certificate bundle to one or more network entities associated with a virtual cloud network.

* * * * *